(12) United States Patent
Caretti et al.

(10) Patent No.: US 11,425,777 B2
(45) Date of Patent: Aug. 23, 2022

(54) METHOD AND SYSTEM FOR DATA TUNNELING IN DEVICE TO DEVICE COMMUNICATION ASSISTED BY A TELECOMMUNICATION NETWORK

(71) Applicant: TELECOM ITALIA S.p.A., Milan (IT)

(72) Inventors: Marco Caretti, Turin (IT); Giovanni Nardini, Pisa (IT); Dario Sabella, Turin (IT); Giovanni Stea, Pisa (IT); Antonio Virdis, Pisa (IT)

(73) Assignee: TELECOM ITALIA S.p.A., Milan (IT)

( * ) Notice: Subject to any disclaimer, the term of this patent is extended or adjusted under 35 U.S.C. 154(b) by 46 days.

(21) Appl. No.: 16/300,994

(22) PCT Filed: May 13, 2016

(86) PCT No.: PCT/EP2016/060864
§ 371 (c)(1),
(2) Date: Nov. 13, 2018

(87) PCT Pub. No.: WO2017/194160
PCT Pub. Date: Nov. 16, 2017

(65) Prior Publication Data
US 2020/0128606 A1 Apr. 23, 2020

(51) Int. Cl.
*H04W 76/23* (2018.01)
*H04W 76/22* (2018.01)

(52) U.S. Cl.
CPC .......... *H04W 76/22* (2018.02); *H04W 76/23* (2018.02)

(58) Field of Classification Search
CPC ............................. H04W 76/22; H04W 76/23
See application file for complete search history.

(56) References Cited

U.S. PATENT DOCUMENTS 10,038,572 B1 * 7/2018 Seshadri ............. H04L 12/4633
2008/0084883 A1 * 4/2008 Sun ...................... H04L 69/324
370/392
(Continued)

FOREIGN PATENT DOCUMENTS

WO WO 2014/068464 A2 5/2014
WO WO 2014/068464 A3 5/2014

OTHER PUBLICATIONS

International Search Report and Written Opinion dated Dec. 7, 2016 in PCT/EP2016/060864 filed on May 13, 2016.

*Primary Examiner* — Lakeram Jangbahadur
(74) *Attorney, Agent, or Firm* — Oblon, McClelland, Maier & Neustadt, L.L.P.

(57) ABSTRACT

A method for managing data packets transmitted by a first user equipment to be received by a second user equipment through a radio network includes having the radio network comprising a radio transceiver station receive data packets transmitted by the first user equipment. For each data packet received, checking whether the data packet comprises a request for a data packet tunneling. For each data packet comprising a request for data packet tunneling, providing the data packet to a relay protocol entity at a Radio Link Control protocol layer. The relay protocol entity is configured for generating at least one tunneling data packet, said generating at least one tunneling data packet comprises inserting at least a portion of the transmitted data packet into the at least one tunneling data packet and transmitting the tunneling data packet to the second user equipment.

10 Claims, 15 Drawing Sheets

(56) References Cited

U.S. PATENT DOCUMENTS

| | | | | |
|---|---|---|---|---|
| 2010/0103862 A1* | 4/2010 | Ulupinar | ............... | H04W 40/22 |
| | | | | 370/315 |
| 2013/0064198 A1* | 3/2013 | Krishnaswamy | ....... | H04L 45/24 |
| | | | | 370/329 |
| 2014/0348168 A1* | 11/2014 | Singh | .................. | H04L 12/4641 |
| | | | | 370/392 |
| 2014/0351645 A1* | 11/2014 | Jain | ..................... | H04L 12/4633 |
| | | | | 714/37 |
| 2015/0289312 A1* | 10/2015 | Ranta | ..................... | H04L 69/22 |
| | | | | 370/328 |

\* cited by examiner

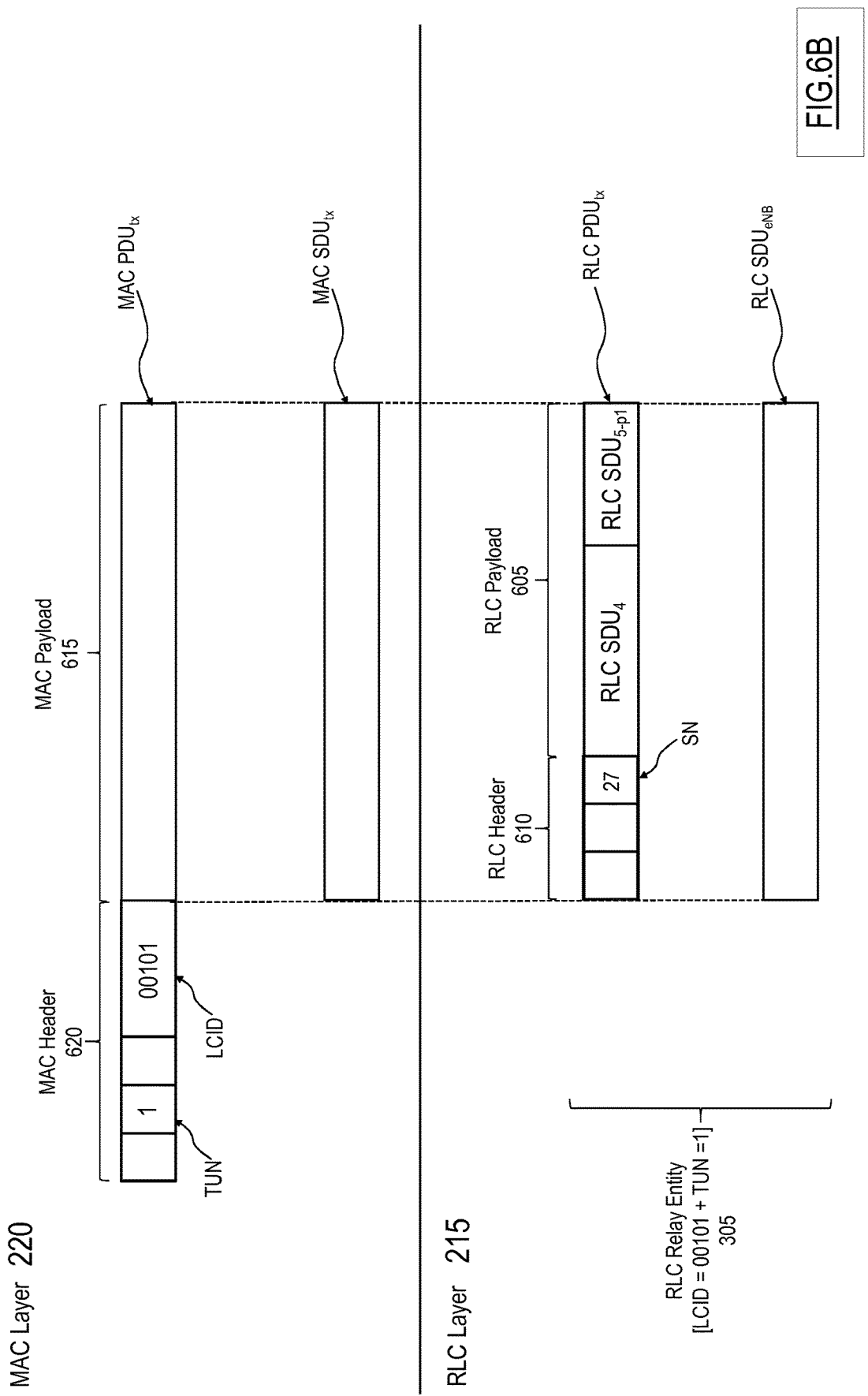

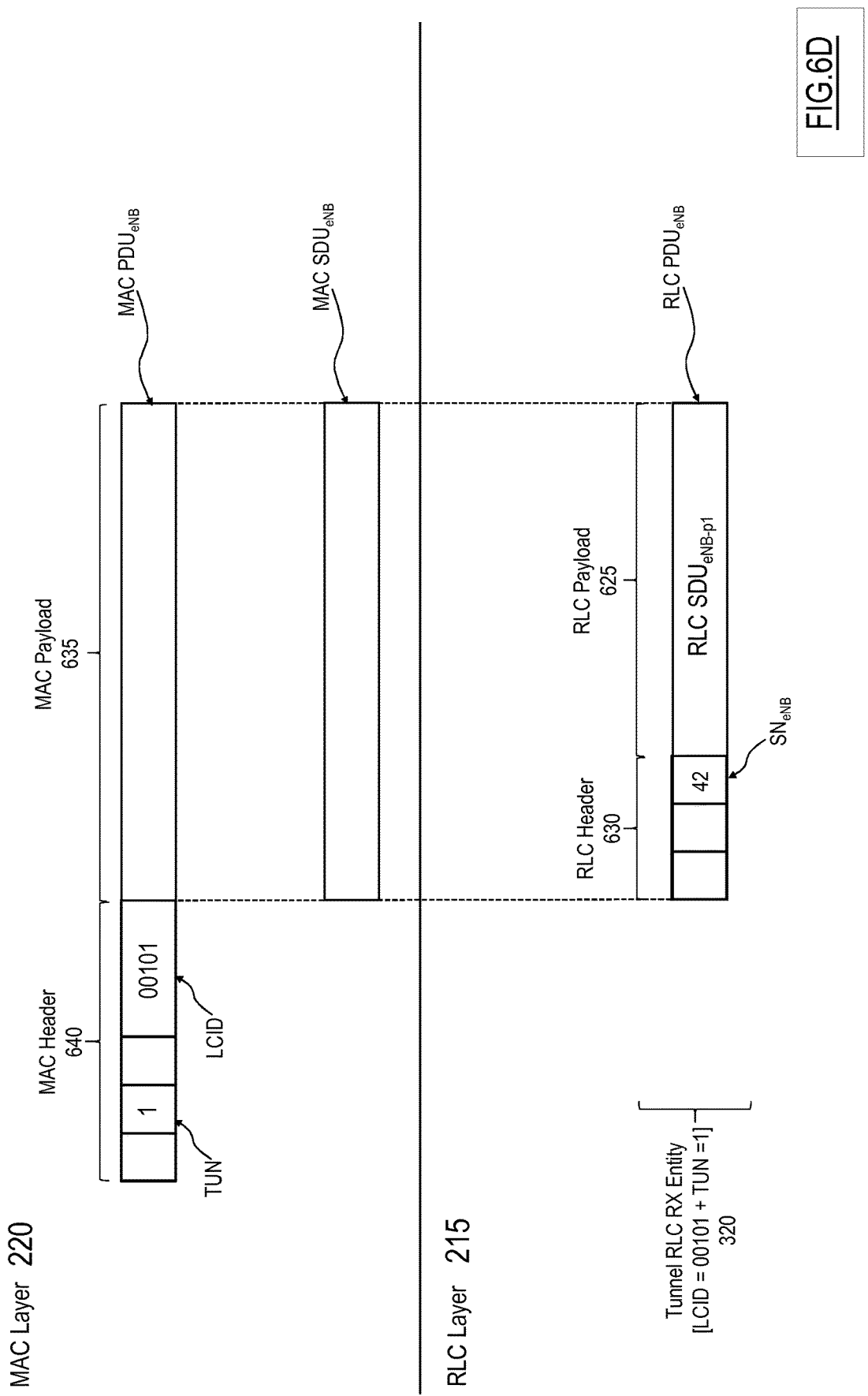

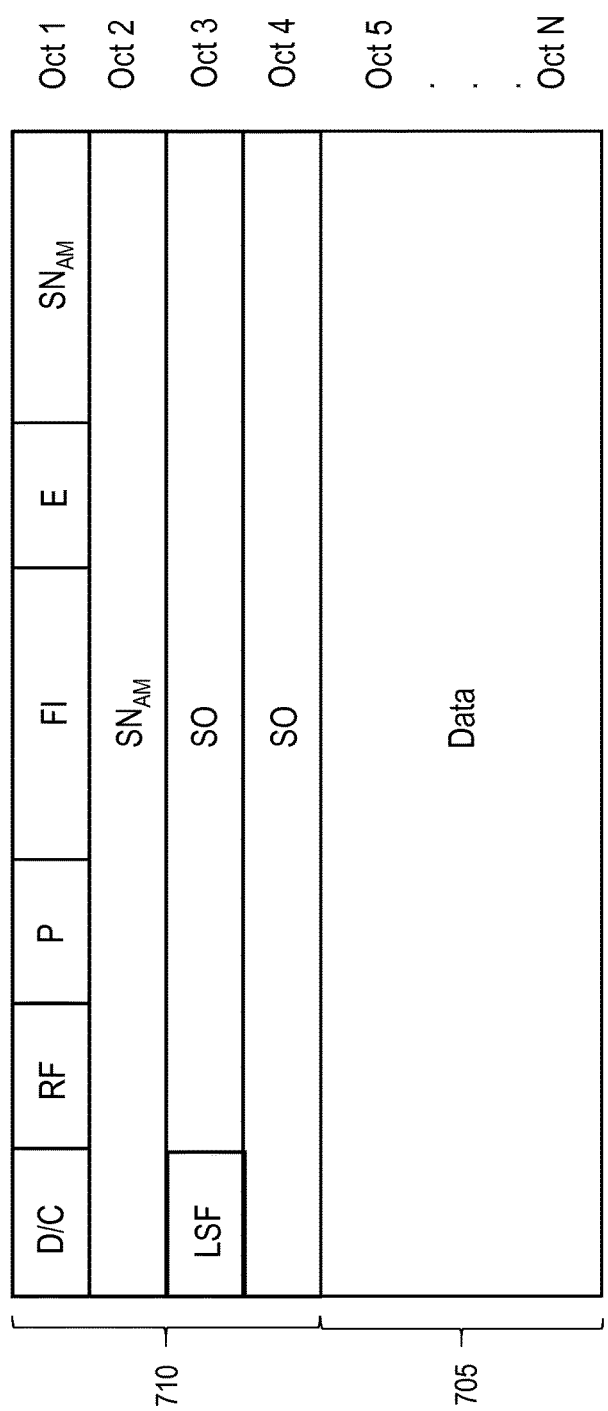

METHOD AND SYSTEM FOR DATA TUNNELING IN DEVICE TO DEVICE COMMUNICATION ASSISTED BY A TELECOMMUNICATION NETWORK

BACKGROUND OF THE INVENTION

Field of the Invention

The present invention refers to communication systems. More particularly, the present invention relates to the field of wireless or mobile telecommunication networks. Even more particularly, the present invention relates to a system and method adapted to implement a data tunneling in Device-to-Device (D2D) communications assisted by a communication network.

Overview of the Related Art

Generally, in a mobile (cellular) telecommunication network, communications among mobile communication devices (e.g., mobile telephones, smartphones and tablets)—generally referred to as User Equipment, or UE in brief—pass through the telecommunication network infrastructure: two UE, connected to respective "serving" radio transceivers of the network (e.g., radio transceivers of a same or different eNodeB—evolved Node B—in the 3GPP Long Term Evolution (LTE)/LTE Advanced (LTE-A) systems), communicate with each other by means of physical communication channel(s) that are set-up and terminated between the radio transceivers and the UE.

As an alternative to communication based on such traditional "2-hop" connection, which hereinafter will be also referred to as Infrastructure Mode (IM) connection, recently UE have been made available that are also capable of communicating directly with each other when they happen to be within a relatively short range.

This direct radio communication among UE is commonly referred to as "Device-to-Device" (D2D) communication based on a Direct Mode (DM) connection, which exploits DM connection links, or sidelinks, directly established between two (or more) UE.

DM connection differs from the IM connection in that the information is exchanged through physical communication channels that are set-up and terminated between the UE directly (i.e., comprised in the sidelinks) without passing through the infrastructure of the mobile communication network.

The sidelinks between UE communicating directly among them are generally established over frequencies comprised in a communication frequency range used for the IM connections.

Due to mobility of the UE and the necessity of spectrum reuse within the mobile communication network, it is necessary to allow a DM connection to be reverted to an IM connection and back from an IM connection to a DM connection.

In facts, channel conditions on the sidelinks may deteriorate (e.g., because the two UE are moving away from each other), or the same spectrum could be claimed back by the eNodeB to be used for other, communication data flows managed by the latter in order to avoid strong interferences.

In such occurrences, either the current connection may be aborted (disrupting the ongoing communication) or it is switched from DM to IM.

Unfortunately, in conventional mobile communication networks a loss of Protocol Data Units (PDUs, i.e. packets of data outputted by a protocol stack layer) during a mode switch (i.e., a switch from a DM connection to a IM connection or vice versa) is unavoidable, since it is due to the Packet Data Convergency Protocol (PDCP) and Radio Link Control (RLC) structure and procedures generally implemented in the mobile communication network.

Generally, three network elements are involved in a mode switch: a transmitter UE, a receiver UE, and an eNodeB managing communications in the cell(s) in which the UE are located.

If a D2D communication is ongoing on a sidelink, then the transmitter UE and the receiver UE have a PDCP peering established. In other words, PDCP PDUs (i.e., PDUs generated at the PDCP layer) transmitted by the transmitter UE have a coherent sequence numbering and a consistent ciphering/deciphering keys so that the receiver UE is able to identify and to arrange in a correct order the PDCP PDUs received from the transmitter UE.

Conversely, two different PDCP peering must be used in IM connection: one between the transmitter UE and the eNodeB (i.e., the UL leg of the communication), another between the eNodeB and the receiver UE (i.e., the DL leg of the communication).

When a mode switch occurs, a new PDCP peering has to be established, because in IM connection the ciphering/deciphering occurs separately hop-by-hop, and the same set of ciphering/deciphering keys used for the DM connection cannot be used for both the UL and the DL legs of the IM connection in order to avoid communication malfunctions.

Moreover, during a transmission PDCP PDUs are received at the RLC layer of the transmitter UE as RLC Service Data Units (SDU, i.e. packets of data inputted to a protocol stack layer) where they are encapsulated and, possibly segmented, in corresponding RLC PDUs which are passed to the MAC layer for being transmitted.

For this reason, also a peering at the RLC layer has to be established between the transmitter UE and the receiver UE in DM connection, or between the transmitter UE and the eNodeB and between the latter and the receiver UE in IM connection.

Accordingly, the sequence numbers of RLC PDUs cannot be assumed to be synchronized after a mode switch from a DM connection to an IM connection or vice versa, i.e. the sequence numbers of RLC PDUs of the DM connection is not synchronized with the sequence numbers of RLC PDUs of the UL or the DL legs of the IM connection.

Particularly, RLC PDUs received by the receiver UE during a DM connection have different sequencing number and ciphering/deciphering keys with respect to RLC PDUs received by the receiver UE during an IM connection.

Having separate RLC peering (i.e., synchronization between transmitting and receiving network elements) for the DM and the IM connections implies that, after a mode switch, each RLC PDU in the transmitter UE that is waiting to be transmitted according to the "old" peering (e.g., RLC PDUs generated to be transmitted through a DM connection) is completely useless, not being correctly identified at the receiver UE and is discarded.

In addition, each RLC PDU already generated for being transmitted according to the "old" peering cannot be transmitted according to the "new" peering (e.g., RLC PDU generated to be transmitted through an IM connection), since the RLC PDU is already ciphered using the wrong ciphering keys (i.e., the ciphering keys for the DM connection are generally different than that used for the IM connection).

Moreover, segments of RLC SDUs (encapsulated in corresponding RLC PDUs) that have been already received at the receiver UE at the time of the mode switch are to be discarded as well (i.e., at least at the expiry of a RLC reassembly timeout of the receiver UE), since their missing counterparts, buffered at the transmitter UE according to the "old" peering, cannot be correctly received as described above.

Such losses may have heavy repercussions on communication effectiveness.

For example, UDP-based multimedia flows, such as video or voice data streams, are highly sensitive to losses, which impair the quality of experience of the final user.

Similarly, TCP-based applications are extremely sensitive to losses, which are treated by TCP protocol as congestion signals, thereby reducing the congestion window and thus the throughput. Thus, several TCP applications perceiving a(n alleged) congestion signal simultaneously cause a major, long-lasting and unnecessary reduction of aggregate (cell) throughput.

Handover procedures cannot be effectively implemented during mode switches, since they would imply high latencies.

In addition, it should be noticed that mode switches may be frequent (e.g., in the order of few seconds) according to UE movement and resource availability of the mobile communication network, i.e. generally much more frequent than handovers between eNodeBs, and—unlike the latter—may interest several data flows at the same time, possibly the data flows occurring within an entire cell managed by an eNodeB, since switching a data flow from the DM connection to the IM connection (or vice versa) may have far-reaching consequences on other data flows provided within the same (and possibly neighboring) cell(s).

Therefore, handover techniques implemented in DM-IM connection mode switching would also sensibly complicating the management of the whole mobile communication network.

It should be noted that the terms "mode switching" and "DM-IM connection mode switching" are herein used, for the sake of conciseness to denote both switching from a DM connection to an IM connection and, vice versa, switching from an IM connection to a DM connection in a communication between UE.

In the art some expedients for mitigating issues related to DM-IM connection mode switching have been proposed.

For example, WO 2014/068464 discloses a method, an apparatus and a computer program product for enabling a D2D bearer to stay alive even in an instance in which a D2D connection is lost. A method is provided that comprises detecting a condition that indicates that a device-to-device bearer is to be terminated. The method may also include modifying a cellular bearer protocol data unit header, such that the cellular bearer protocol data unit header indicates that a cellular bearer service data unit is a device-to-device protocol data unit. The method of this embodiment may also include causing one or more device-to-device protocol data units to be encapsulated within one or more cellular bearer protocol data units, such that the one or more device-to-device protocol data units are transmitted via a cellular bearer.

SUMMARY OF THE INVENTION

The Applicant has observed that, generally, the expedients known in the art are not able to provide for a satisfactory transition between DM and IM connections and vice versa between IM and DM connections during a communication between UE.

Particularly, the applicant has noted that the expedients proposed in WO 2014/068464 may increase latency and introduce excessive overhead which would sensitively lower an effectiveness of the communication between UE.

The Applicant has therefore tackled the problem of how to implement Device-to-Device (D2D) communications and integrate D2D communications in a mobile communication network framework in a lossless and effective way.

Further, the Applicant has tackled the problem of how to implement a mode switching between Direct Mode (DM) to Infrastructure Mode (IM) connections and vice versa with minimal modifications to the protocol stack.

The Applicant has further tackled the problem of implementing DM-IM connection mode switching operating at one or more predetermined layers of protocol layers in a way that is transparent to the upper protocol layers of the receiver.

Particularly, one aspect of the present invention proposes a method for managing data packets transmitted by a first user equipment to be received by a second user equipment through a radio network is proposed. The method comprising having the radio network comprising a radio transceiver station configured for receiving data packets transmitted by the first user equipment; for each data packet received, checking whether the data packet comprises a request for a data packet tunneling; for each data packet comprising a request for data packet tunneling, providing the data packet to a relay protocol entity at a Radio Link Control protocol layer. The relay protocol entity is configured for generating at least one tunneling data packet, said generating at least one tunneling data packet comprises inserting at least a portion of the transmitted data packet into the at least one tunneling data packet and transmitting the tunneling data packet to the second user equipment.

Preferred features of the present invention are set in the dependent claims.

In one embodiment of the present invention, receiving data packets transmitted by the first user equipment comprises receiving Medium Access Control data packets at a Medium Access Control protocol layer, each Medium Access Control data packet comprising a header portion and a payload portion. In addition, checking whether the data packet comprises a request for a data packet tunneling comprises checking whether the header of each Medium Access Control data packet comprises the request for a data packet tunneling.

In one embodiment of the present invention, checking whether the header of each Medium Access Control data packet comprises a request for a data packet tunneling comprises checking a value of a predetermined reserved bit comprised in the header of the Medium Access Control data packet.

In one embodiment of the present invention, checking whether the header of each Medium Access Control data packet comprises a request for a data packet tunneling comprises checking a value of a predetermined sequence of bits comprised in the header of the Medium Access Control data packet.

In one embodiment of the present invention, the payload of the Medium Access Control data packet comprises at least a portion of a Radio Link Control data packet. In addition, generating at least one tunneling data packet comprises generating at least one Radio Link Control tunneling data packet at the Radio Link Control protocol layer, said generating at least one Radio Link Control tunneling data packet comprises inserting at least a portion of the Radio Link Control data packet into the at least one Radio Link Control tunneling data packet.

In one embodiment of the present invention, the Radio Link Control tunneling data packet comprises a tunneling header portion and a tunneling payload portion. In addition, generating at least one Radio Link Control tunneling data packet comprises inserting the at least a portion of the Radio Link Control data packet in the payload of the at least one Radio Link Control tunneling data packet.

In one embodiment of the present invention, the Radio Link Control data packet comprises a header portion and a payload portion. In addition, the header portion of the Radio Link Control data packet comprises an indication of a position in a sequence of Radio Link Control data packets thereof, and the tunneling header portion of the Radio Link Control tunneling data packet comprises an indication of a tunneling position in a sequence of Radio Link Control tunneling data packets thereof. Advantageously, the indication of a position is different from the indication of a tunneling position.

In one embodiment of the present invention, transmitting the tunneling data packet to the second user equipment comprises generating a Medium Access Control data packet, the Medium Access Control data packet comprising a header portion and a payload portion, wherein the header of the Medium Access Control data packet comprising an indication that a tunneling of data packets has been implemented, and the payload of the Medium Access Control data packet comprises the at least one Radio Link Control tunneling data packet, and transmitting the Medium Access Control data packet to the second user equipment.

In one embodiment of the present invention, generating at least one tunneling data packet, comprises generating at least one tunneling data packet as at least one Acknowledge Mode data packet, and inserting at least a portion of the transmitted data packet into the at least one Acknowledge Mode data packet.

In one embodiment of the present invention, the transmitted data packet comprises a Radio Link Control data packet, the Radio Link Control data packet comprising an indication of a position in a sequence of Radio Link Control data packets thereof. In addition, generating at least one tunneling data packet as at least one Acknowledge Mode data packet comprises setting an indication of a position in a sequence of Acknowledge Mode data packets of the Acknowledge Mode data packet equal to the indication of a position in a sequence of Radio Link Control data packets comprised in the Radio Link Control data packet.

In one embodiment of the present invention, inserting at least a portion of the transmitted data packet into the at least one Acknowledge Mode data packet comprises segmenting the Radio Link Control data packet in two or more segments; for each segment of the Radio Link Control data packet inserting the segment of the Radio Link Control data packet in a respective Acknowledge Mode data packet, and providing in the Acknowledge Mode data packet an indication of a position of the segment of the Radio Link Control data packet in the Radio Link Control data packet of which is part.

Another aspect of the present invention proposes a further method for managing data packets transmitted by a first user equipment to be received by a second user equipment. The method comprising having the second user equipment configured for receiving data packets transmitted by the first user equipment or by a radio transceiver station of a radio network; for each data packet, checking whether the data packet comprises an indication of the implementation of a data packet tunneling; for each data packet comprising an indication of the data packet tunneling, providing the data packet to a tunneling receiver protocol entity at a Radio Link Control protocol layer. The tunneling receiver protocol entity being configured for extracting at least a portion of a tunneled data packet from said data packet, and providing the at least a portion of a tunneled data packet to a receiver protocol entity at the Radio Link Control protocol layer.

In one embodiment of the present invention, receiving data packets transmitted by the first user equipment or by a radio transceiver station of a radio network comprises receiving Medium Access Control data packets at a Medium Access Control protocol layer, each Medium Access Control data packet comprising a header portion and a payload portion. In addition, checking whether the data packet comprises an indication of the data packet tunneling comprises checking whether the header of each Medium Access Control data packet comprises the indication of the data packet tunneling.

In one embodiment of the present invention, checking whether the header of each Medium Access Control data packet comprises a request for a data packet tunneling comprises checking a value of a predetermined reserved bit comprised in the header of the Medium Access Control data packet.

In one embodiment of the present invention, checking whether the header of each Medium Access Control data packet comprises a request for a data packet tunneling comprises checking a value of a predetermined sequence of bits comprised in the header of the Medium Access Control data packet.

In one embodiment of the present invention, the payload portion of the Medium Access Control data packets comprises a Radio Link Control tunneling data packet. In addition, extracting at least a portion of a tunneled data packet from said data packet comprises extracting at least a portion of a Radio Link Control data packet generated by the first user equipment from the Radio Link Control tunneling data packet.

In one embodiment of the present invention, said Radio Link Control tunneling data packet comprises a header portion and a payload portion, the at least a portion of a Radio Link Control data packet) generated by the first user equipment being comprised in said payload portion of the Radio Link Control tunneling data packet.

In one embodiment of the present invention, the header portion of the Radio Link Control tunneling data packet comprises an indication of a position in a sequence of Radio Link Control tunneling data packets thereof. In addition, providing the at least a portion of a tunneled data packet to a receiver protocol entity at the Radio Link Control protocol layer comprises reconstructing a Radio Link Control data packet by combining portions of the Radio Link Control data packet contained in the payload of Radio Link Control tunneling data packet comprising indications of adjacent positions in a sequence of Radio Link Control tunneling data packets.

Another aspect of the present invention proposes a still further method for managing data packets transmitted by a first user equipment to be received by a second user equipment. The method comprises having the first user equipment configured for generating data packets; transmitting the data packets to the second user equipment or to a radio transceiver station of a radio network. Advantageously, generating data packets comprises providing a request for a data packet tunneling in data packets to be transmitted to the radio transceiver station.

In one embodiment of the present invention, generating data packets comprises generating Medium Access Control data packets at a Medium Access Control protocol layer, each Medium Access Control data packet comprising a header portion and a payload portion. In addition providing a request for a data packet tunneling comprises providing a request for a data packet tunneling within the header of Medium Access Control data packets.

In one embodiment of the present invention, providing a request for a data packet tunneling within the header of Medium Access Control data packets comprises providing a request for a data packet tunneling within the header of Medium Access Control data packets by setting a value of a predetermined reserved bit comprised in the header of the Medium Access Control data packet.

In one embodiment of the present invention, providing a request for a data packet tunneling within the header of Medium Access Control data packets comprises providing a request for a data packet tunneling within the header of Medium Access Control data packets by setting a value of a predetermined sequence of bits comprised in the header of the Medium Access Control data packet.

In one embodiment of the present invention, providing a request for a data packet tunneling in data packets to be transmitted to the radio transceiver station comprises providing a request for a data packet tunneling in data packets to be transmitted to the radio transceiver after switching from a Direct Mode connection in which data packets are transmitted directly to the second user equipment to an Infrastructure Mode connection in which data packets are transmitted to the second user equipment through the radio transceiver station of the radio network.

Another aspect of the present invention proposes a radio network comprising a radio transceiver station arranged for managing data packets transmitted by a first user equipment to be received by a second user equipment, the radio transceiver station comprising hardware, firmware, a combination of hardware and software, or software configured for implementing the method of above.

Another aspect of the present invention proposes a user equipment arranged for transmitting to and/or receiving from a further user equipment data packets by means of a Direct Mode connection in which data packets are directly transmitted to and/or received from the further user equipment or by means of an Infrastructure Mode connection in which data packets are transmitted to and/or received from the user equipment and the further user equipment through a radio transceiver station of a radio network, the user equipment comprising hardware, firmware, a combination of hardware and software, or software configured for implementing the method of above.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIGS. 6A to 6E schematically shows some stages of a communication based on an IM connection according to an embodiment of the invention;

FIG. 7 schematically shows a structure of a generic RLC Acknowledge Mode PDU;

DETAILED DESCRIPTION OF THE INVENTION

Figure 1A:
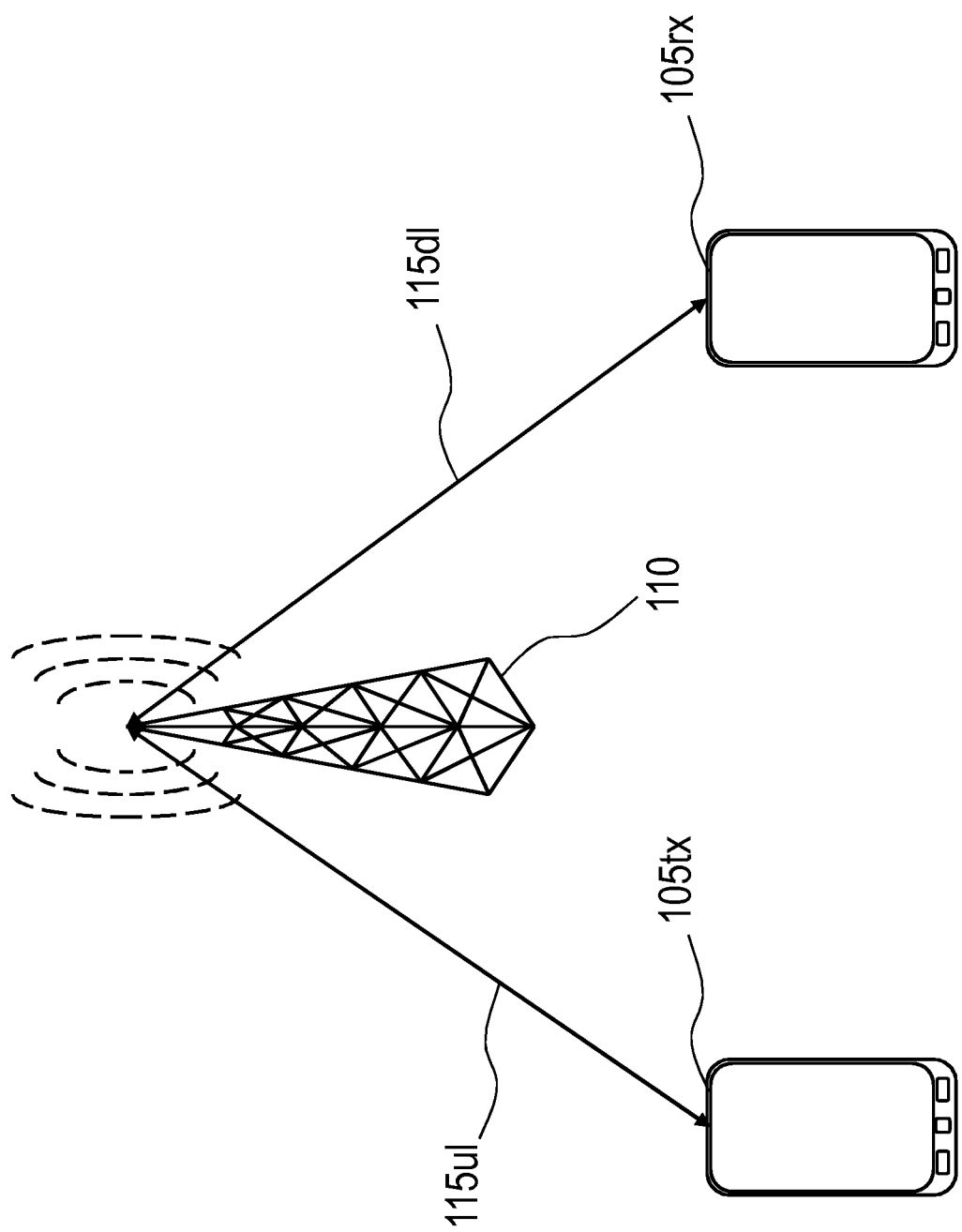
FIG. 1A is a radio network arrangement in which two User Equipment communicate through an Infrastructure Mode connection.
Figure 1B:
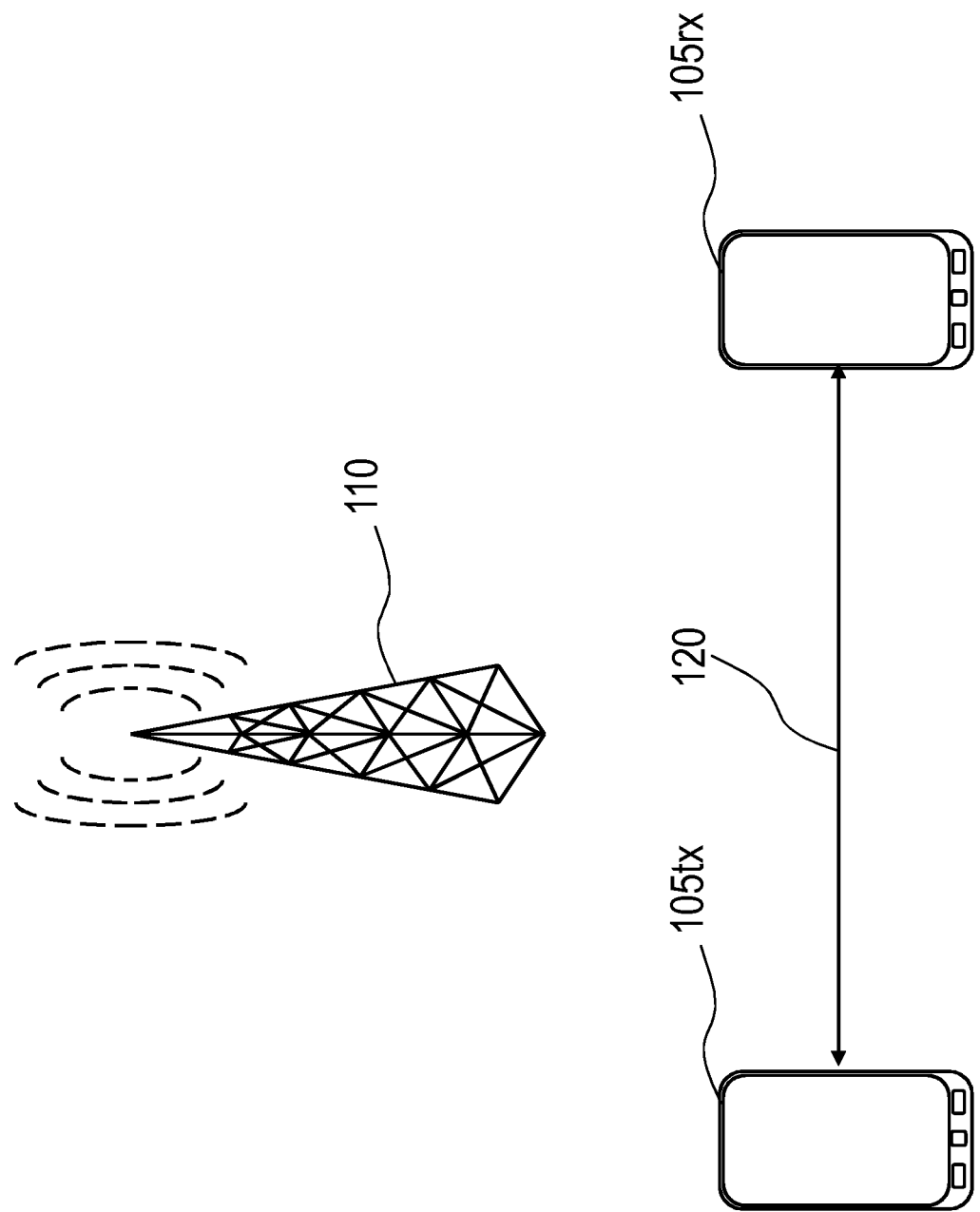
FIG. 1B is a radio network arrangement in which two User Equipment communicate through a Direct Mode connection.

With reference to the drawings, FIGS. 1A and 1B is a radio network arrangement in which two User Equipment, or UE 105 (e.g., a smartphone, a tablet, a laptop/notebook, etc.), communicate through an Infrastructure Mode, or IM, connection and through a Direct Mode, or DM, connection, respectively.

In the IM connection (as shown in FIG. 1A), a transmitter UE 105$tx$ establishes an uplink, or UL, 'leg' 115$ul$ of the connection with a respective "serving" radio transceiver station of the radio network, e.g. an evolved Node B, eNB 110 in 3GPP Long Term Evolution (LTE)/LTE Advanced (LTE-A) systems, and transfers communication data (e.g. data packets) to be received by a receiver UE 105$rx$ to the eNB 110. Then, the eNB 110 transmits the data packets to the receiver UE 105$rx$ by establishing a downlink, or DL, leg 115$dl$ of the connection with the receiver UE 105$rx$.

Conversely, in DM connection (as shown in FIG. 1B) the transmitter UE 105$t$ transfers communication data directly to the receiver UE 105$rx$ by establishing a sidelink 120 with the latter.

During communication, user and control data to be transmitted by the transmitter UE 105$tx$ are processed by the packet data convergence protocol (PDCP), the radio link control (RLC) protocol and the medium access control (MAC) protocol, before being passed to the physical layer for (radio) transmission.

Figure 2:
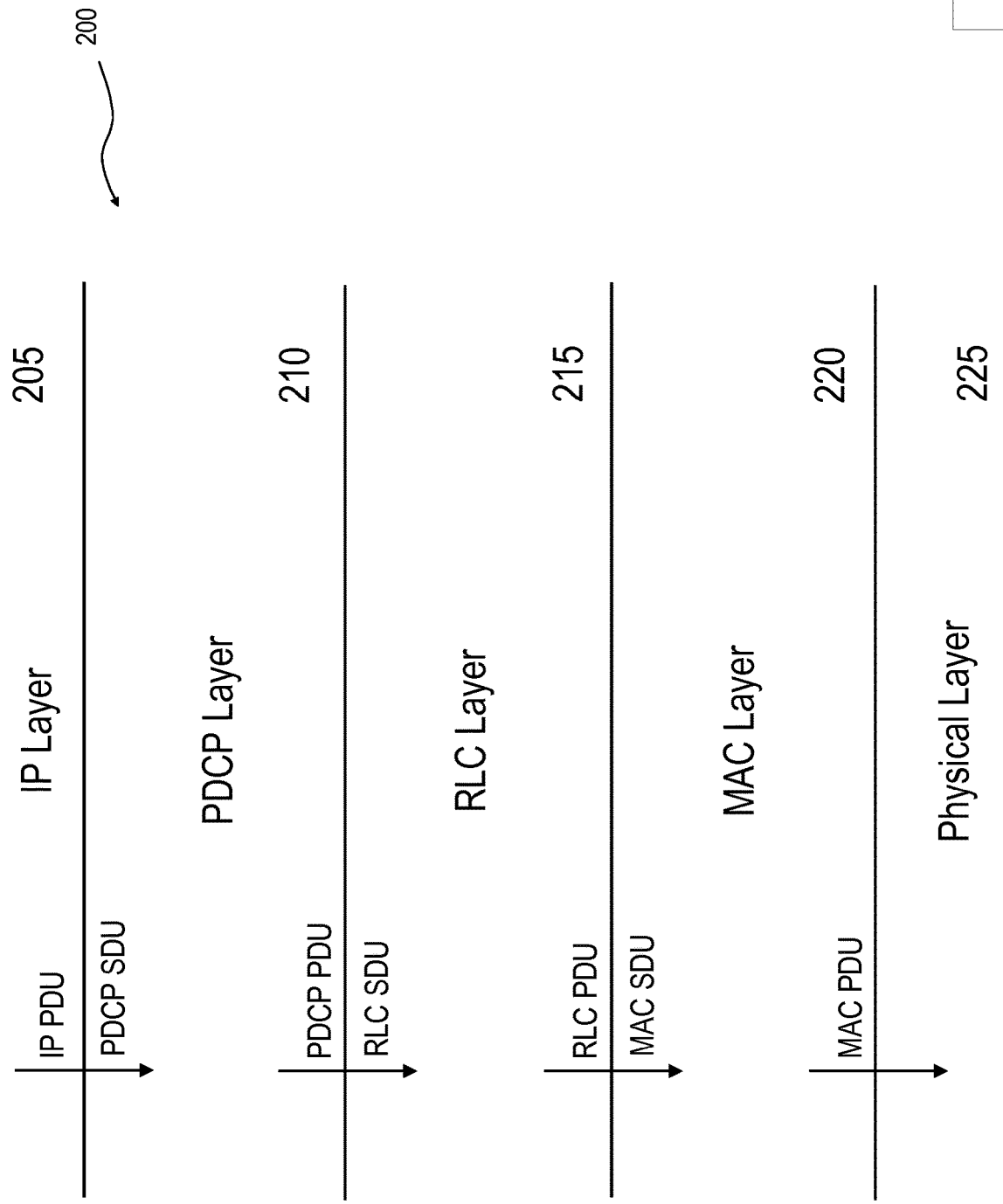
FIG. 2 schematically shows a portion of a protocol layer stack.

For example, by making reference to FIG. 2 that is a schematic representation of a portion of the protocol layer stack 200, the transmission of data packets proceeds in the following manner.

At the transmitter UE 105$tx$, information data generated at higher protocol layers (e.g., by software applications)

descends the protocol stacks being processed substantially at each layer before being transmitted. Particularly, after being processed at an Internet Protocol (IP) Layer 205, data are received at a PDCP layer 210. Particularly, data belonging to a data flow are subdivided in data packets, which are denoted to as PDCP Service Data Units, or SDUs received at the PDCP layer 210. It should be noted that data packets received at a protocol layer are generally called Service Data Unit (SDU).

At the PDCP layer 210 PDCP Packet Data Units, or PDUs (PDU is generic name for data packet outputted by a layer) are generated, e.g. by segmenting and/or otherwise processing PDCP SDUs previously received. The PDCP PDUs are sent to a RLC layer 215 where are received as corresponding RLC SDUs.

At the RLC layer 215, RLC SDUs are segmented and processed thus producing corresponding RLC PDUs. The RLC PDUs are submitted to a MAC layer 220 (where are considered as MAC SDUs).

At the MAC layer 220 a MAC header is added to the MAC SDUs and a padding may be implemented to fit MAC SDUs in Transmission Time Interval, or TTI. Afterwards, MAC PDU are transferred to a physical layer 225 for being transmitted onto physical channels.

Similarly, (transmitted) data received at the physical layer of the receiver UE 105r are processed by the layers of the protocol stack, particularly the medium access control (MAC) protocol, the radio link control (RLC) protocol and packet data convergence protocol (PDCP), before the user and control data are passed to higher layer of the protocol stack (applying substantially the same procedures just described in a reverse order as described in the following).

Particularly, both at the PDCP and RLC layers the respective PDCP PDUs and RLC PDUs are generally ciphered by means of respective ciphering keys and numbered in order that the PDUs may be ordered in a sequence (and thus correctly reconstruct data therein contained) once received at the receiver UE 105rx.

In a DM connection, the transmitter UE 105tx and receiver UE 105rx have PDCP and RLC peering established—i.e., ciphering keys and sequence numbers used by the transmitter UE 105tx are known by the receiver UE 105rx—, in order to allow the receiver UE 105rx to correctly order and decipher the PDUs sent by the transmitter UE 105tx.

Conversely, in an IM connection an uplink (UL) peering is established between the transmitter UE 105tx and the eNB 110, while a downlink (DL) peering is established between the eNB 110 and the receiver UE 105rx. The UL peering exploits different sequencing numbers and ciphering/deciphering keys for PDUs transmitted by the transmitter UE 105tx than the sequencing numbers and ciphering/deciphering keys for PDUs transmitted by the eNB 110 exploited in DL peering.

In an embodiment of the invention, during an IM connection the RLC PDU generated by the transmitter UE 105tx and received at the eNB 110 (i.e., through a UL leg of the IM connection) are directly forwarded to the receiver UE 105rx by the eNB 110 (i.e., through a DL leg of the IM connection) without being passed to, and therefore processed at, higher protocol layers (e.g., PDCP layer and higher level layers).

In an embodiment of the invention, the RLC PDU generated by the transmitter UE 105tx once received at the eNB 110 in the IM connection are tunneled in a 'tunneling' RLC PDU at the RLC layer 215.

The term 'tunneling' is herein used for indicating the insertion of one or more data packet, and/or a portion of data packet into another data packet performed at a same protocol layer of the protocol layers stack. In the non-limiting embodiment of the present invention herein described, one or more RLC PDUs and/or a portion of a RLC PDU (i.e., a data packet associated with the RLC layer) are inserted into a further RLC PDU (i.e., a further data packet associated with the RLC layer).

Thanks to the tunneling of RLC PDUs according to the embodiments of the invention, mode switching from DM connection to IM connection and/or from IM connection to DM connection is performed substantially in a lossless way, i.e. ensuring an effective communication between the transmitting UE 105tx and the receiving UE 105rx substantially regardless a number and frequency of connection mode switching that may occur during the communication.

Figure 3:
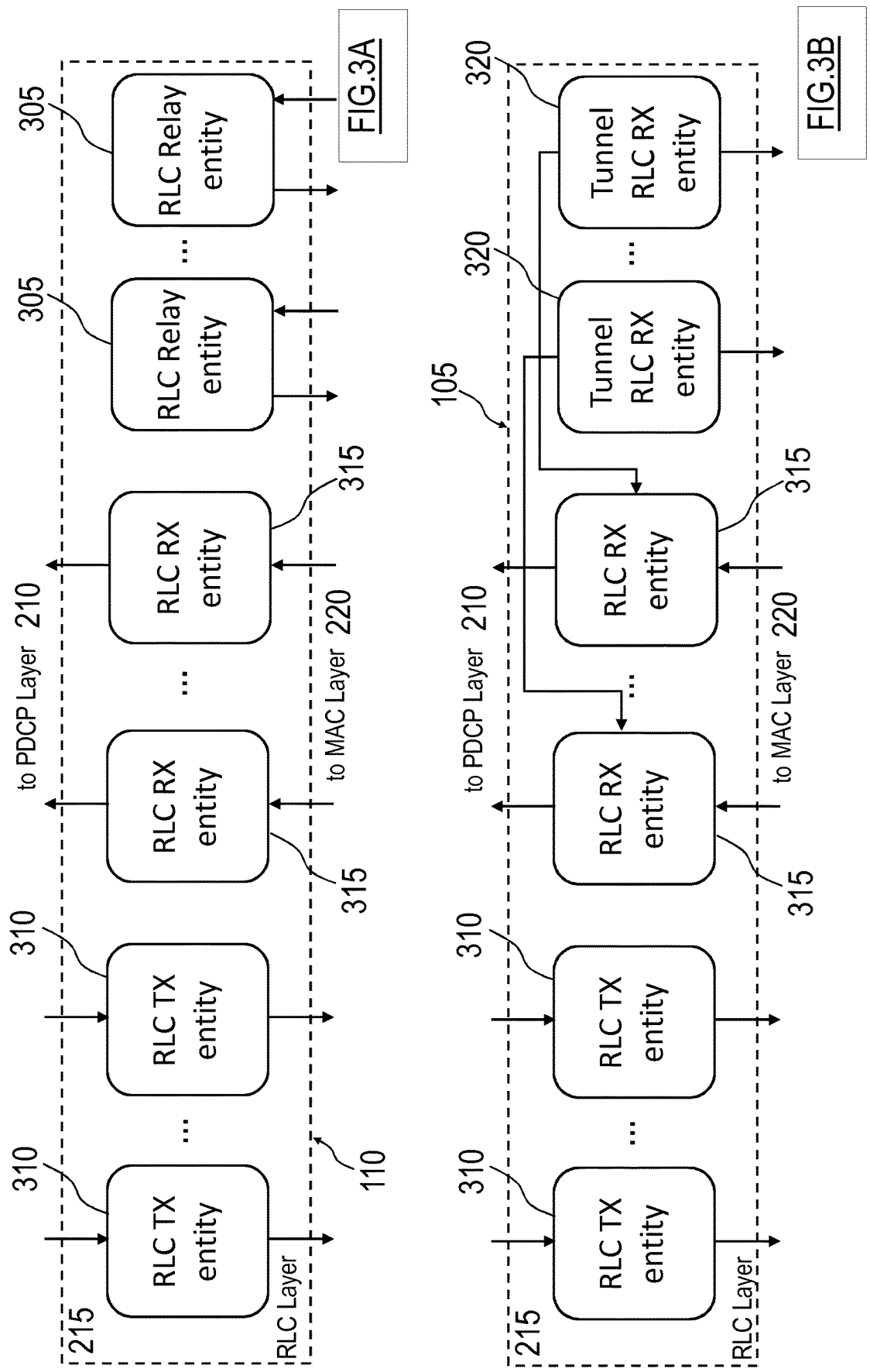
FIG. 3A illustrates protocol entities implemented at the RLC layer of an eNodeB according to an embodiment of the invention.
FIG. 3B illustrates protocol entities implemented at the RLC layer of a UE according to an embodiment of the present invention.

FIGS. 3A and 3B illustrate protocol (operating) entities implemented at the RLC layer 215 of an eNodeB 110 and in UE 105, respectively, according to an embodiment of the invention.

It should be noted that the term 'protocol entity' or more generally the term 'entity' is herein intended to comprise, but not limited to hardware, firmware, a combination of hardware and software, software.

For example, an protocol entity may be, but is not limited to being, a process running on a processor, a processor, an object, an executable, a thread of execution, a program, and/or a computing device (e.g., the UE 105, the eNB 110, as well as other radio network elements).

In other words, an entity may comprise an application being executed on a computing device and/or the computing device itself.

One or more entities may be localized on one computing device and/or distributed between two or more computing devices.

Entities may comprise and/or interact with computer readable media having storing data according to various data structures.

The entities may communicate by exploiting local and/or remote processes, preferably by means of electrical, electromagnetic and/or optical signals providing one or more data packets, such as data packets from one entity interacting with another entity in a local system, in a distributed system, and/or across a radio network and/or a wired network.

The eNB 110 comprises one or more further processing entities arranged at the RLC layer 215 for buffering and/or processing (e.g., segmenting, concatenating, ciphering and/or deciphering) data packets received from adjacent layers.

According to an embodiment of the present invention, the eNB 110 comprises one or more RLC relay entities 305 (as shown in FIG. 3A) at the RLC layer 215, along with RLC TX entities 310 and RLC RX entities 315 (the latter being known in the art and not herein further described for the sake of brevity).

The RLC relay entities 305 are arranged for acting as relays (i.e., for forwarder) of tunneled RLC PDUs as described in the following. The RLC relay entities 305 provide for tunneling of the RLC PDUs received from the transmitter UE 105tx in corresponding tunneling RLC PDU and for forwarding such tunneling RLC PDU to the receiver UE 105rx (as described in the following).

Similarly, the UE 105—i.e., both the transmitter UE 105tx and the receiver 105rx since their role may (and usually do) switch during a communication (i.e., the receiver UE 105rx may transmit data to the transmitter UE 105tx)—in order to correctly process the tunneling PDUs comprise one or more further receiving entities, i.e. tunnel RLC RX entities 320, provided at the RLC layer 215 along with RLC TX entities 310 and RLC RX entities 315.

The tunnel RLC RX entities 320 are arranged for receiving the tunneling PDUs extracting the corresponding RLC PDUs transmitted by the transmitter UE 105*tx* and deliver the latter to respective RLC RX entities 315 (as described in the following).

In an embodiment of the invention, the tunnel RLC RX entities 320 have substantially the same structure and capabilities of a RLC RX entities 315, but the tunnel RLC RX entities 320 are arranged for providing their output to at least one RLC RX entities 315 within the RLC layer 215.

During a communication, in the transmitter UE 105*tx*, when from the MAC layer 220 a transmission allowance is provided to the RLC layer 215 (e.g. UE 105*tx* received a grant from the eNB 110), a RLC TX entity 310 delivers a RLC PDU to the MAC layer 220.

Preferably, a size of the RLC PDU is decided based on a Channel Quality Indication, or CQI, assessed by the transmitter UE 105*tx* on the sidelink 120 in case of a DM connection, or at the eNB 110 for the UL leg 115*ul* in case of an IM connection. It should be noted that the PDU size assessment is transparent to the RLC TX entity 310, which only has to send a RLC PDU of the requested size, performing segmentation and/or concatenation if necessary.

At the MAC layer a corresponding MAC PDU is generated to be sent (through the physical layer 225) either to the receiver UE 105*rx* or to the eNB 110, according to whether a DM connection or an IM connection, respectively, is established. Particularly, the MAC PDU substantially comprises at least a portion of a RLC PDU received from the RLC layer 215 (as described in the following).

Figure 4:
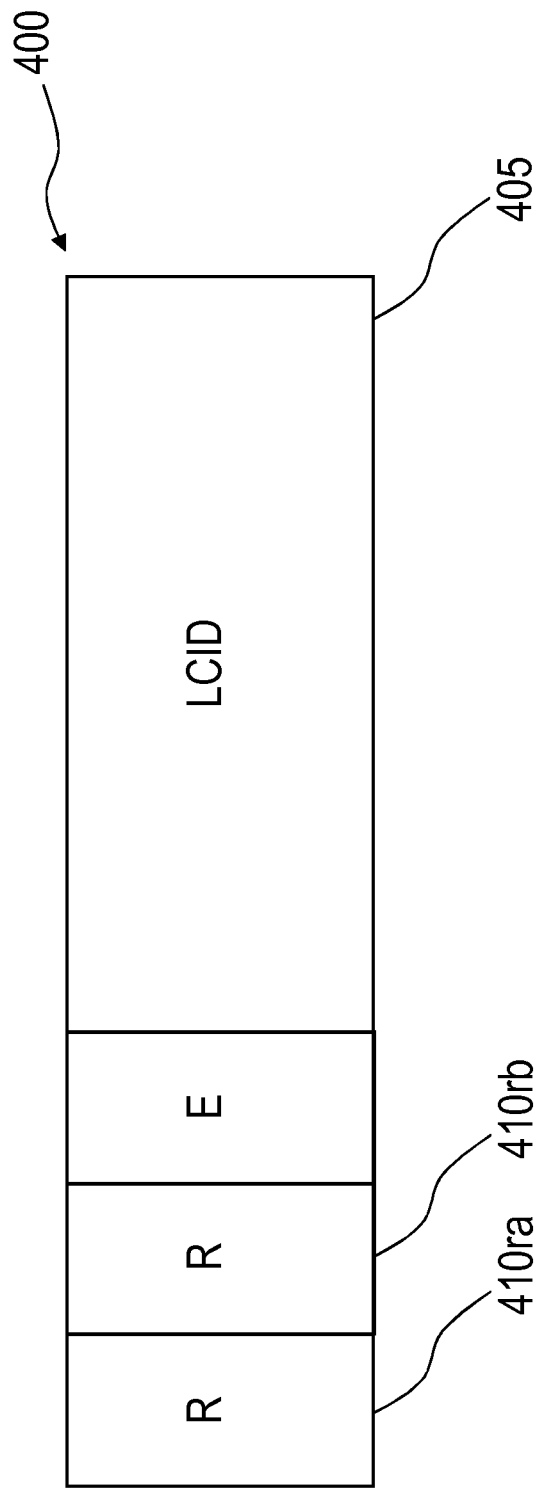
FIG. 4 schematically shows a portion of a header of a generic MAC PDU.

According to an embodiment of the present invention, one or more values of a header of the MAC PDU, a portion of which is shown on FIG. 4 and therein denoted by reference 400, may be exploited for requesting to implement a tunneling of the payload of the MAC PDU (i.e., the RLC PDU).

In detail, the MAC header 400 comprises a Logical RLC connection ID, or LCID, value 405 (e.g. generally comprising 5 bits) which identifies the MAC PDUs comprised in a respective data flow (i.e., data comprised in a predetermined communication, e.g., such as a voice call, a file transfer, a streaming etc.).

During operation, respective RLC relay entities 305, RLC TX entities 310, RLC RX entity 315 and tunnel RLC RX entities 320 (at the transmitter UE 105*tx*, at the eNB 110 and/or at the receiver UE 105*rx*) are arranged for processing RLC PDUs having a predetermined LCID value 405.

According to an embodiment of the present embodiment, in order to distinguish between MAC PDUs for IM and DM connections in a same data flow the LCID value 405 may be exploited.

In other words, the eNB 110 may be arranged for identifying whether a (portion of) RLC PDU comprised in a received MAC PDU is to be provided to a RLC relay entities 305 or to a RLC RX entity 315 based on the LCID value 405 of the MAC PDU.

For example, for distinguishing between IM connections and DM connection belonging to a same data flow a similar LCID value 405 as that used for DM connection, but with the Most Significant Bit, or MSB, is set (equal to one) may be used for identifying a corresponding IM connection (e.g., in case of DM to IM mode switch, in the opposite case the MSB is reset to zero).

Alternatively, two LCID value 405 ranges may be defined for distinguishing between DM and IM connections. For example, LCID values 405 comprised in the range 01011-11011 may be assigned for IM connections, while the other LCID values 405 comprised in the range 00001-01010 may be assigned for DM connections. In this case, during a DM to IM mode switch the LCID values 405 for the IM connection may be simply obtained by adding the binary number 01010 to the LCID values 405 the corresponding DM connection (while in a mode switch from IM connection to DM connection the binary number 01010 is subtracted to the LCID values 405).

In other words, the eNB 110 may be arranged for identifying specific bit patterns in the LCID value 405 of the received MAC PDUs and, accordingly, providing the (portion of) RLC PDUs comprised in such MAC PDUs to a RLC relay entities 305 or to a RLC RX entity 315.

As a further alternative, at least one of the reserved values 410*ra* and 410*rb* of the header of MAC PDUs may be exploited for distinguishing between DM connections and IM connections (thus allowing a larger number, i.e. double, of data flows to be addressed by means of the LCID values with respect to the previous embodiments).

Preferably, one reserved value 410*ra*, hereinafter denoted as tunneling or TUN value 410*ra*, may be exploited for denoting that the MAC PDU comprises a payload (i.e., a RLC PDU) to be tunneled in case of an IM connection.

For example, a TUN value 405*ra* set to one denotes that the payload of the MAC PDU is to be tunneled (as described in the following).

Figure 5A:
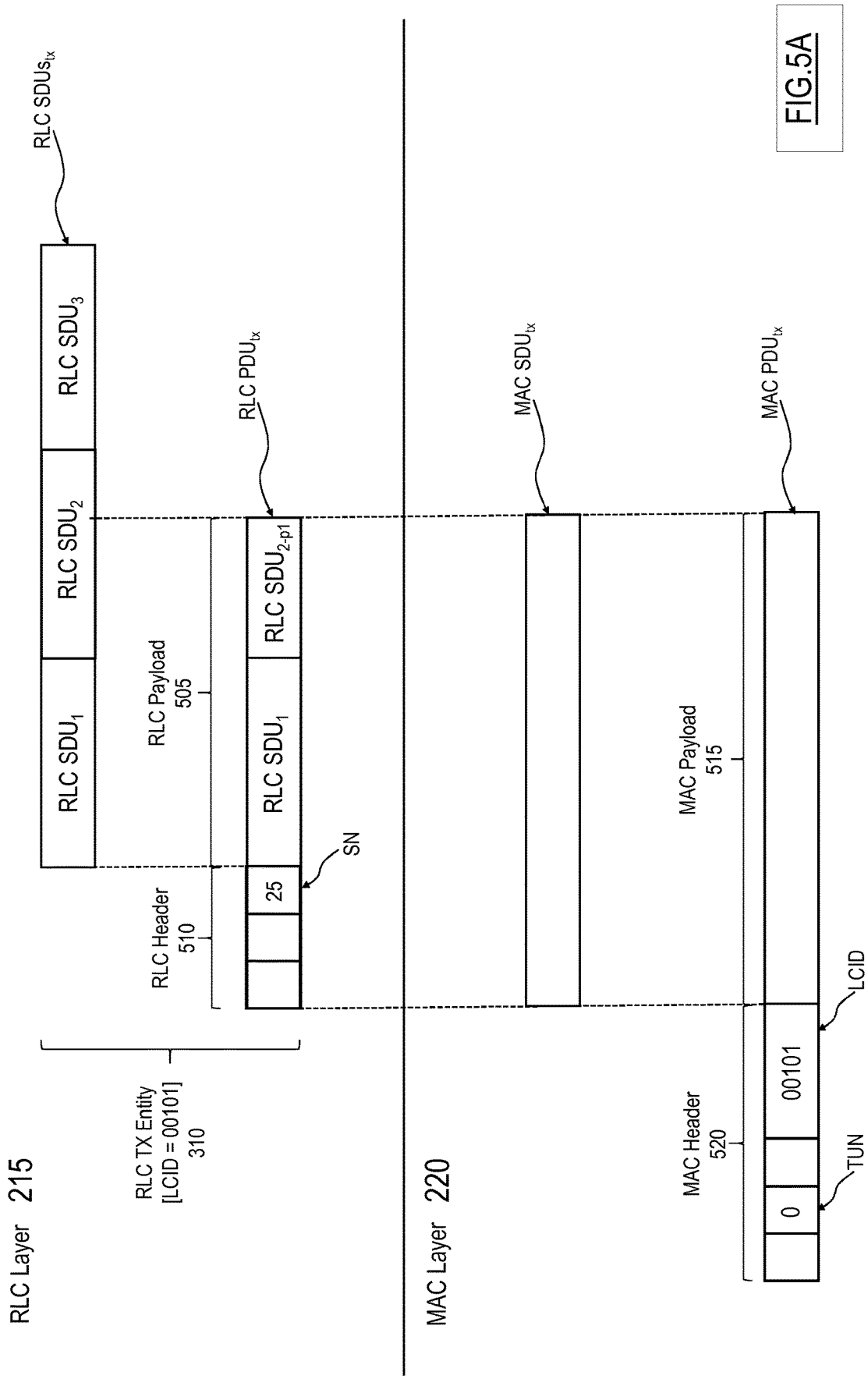
FIGS. 5A and 5B schematically shows some stages of a communication based on a DM connection according to an embodiment of the invention.
Figure 5B:
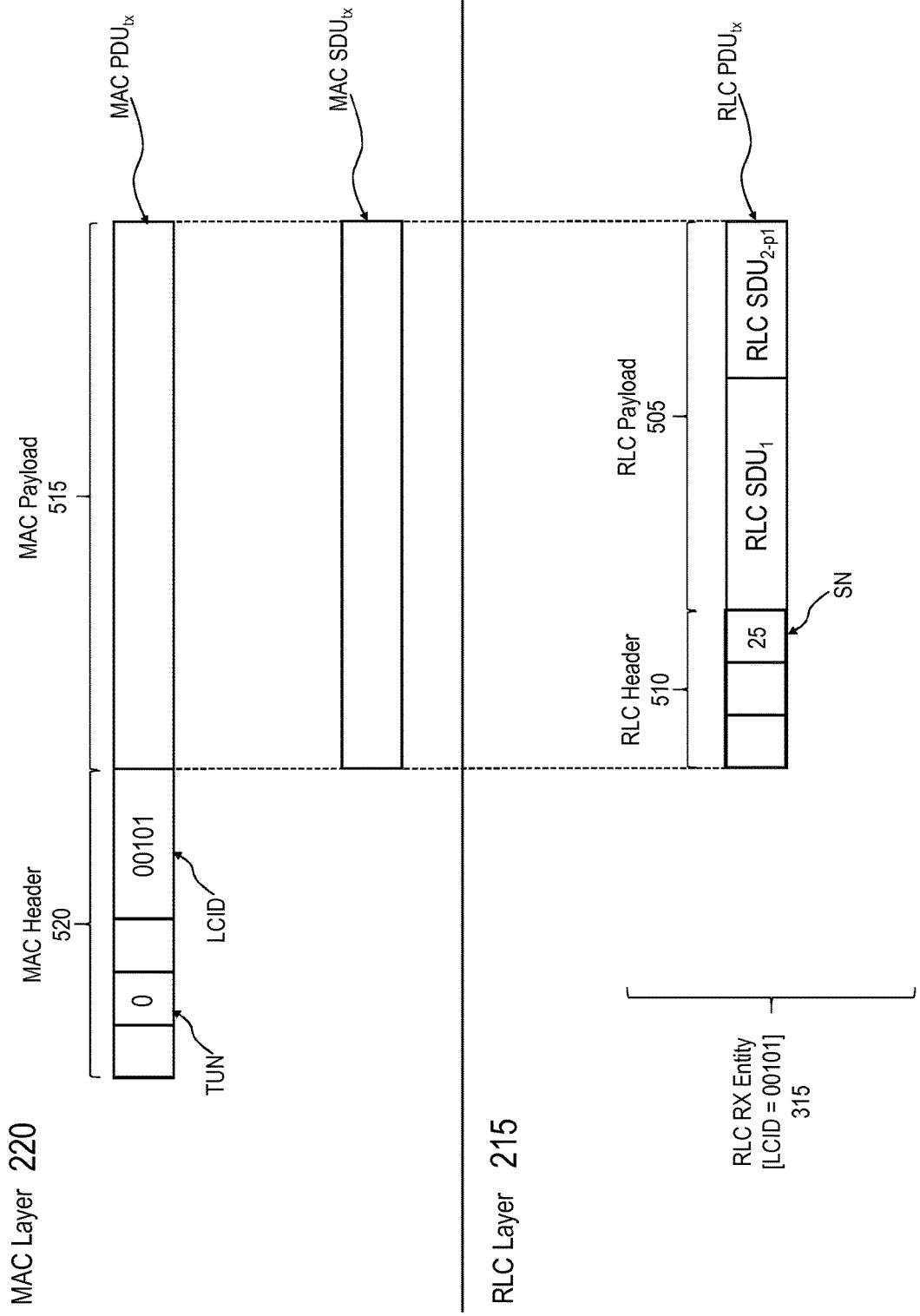

For example, during a communication between UE 105*tx* and 105*rx*, when a DM connection is active, as shown in FIGS. 5A and 5B, packet data exchange operates substantially as in a common D2D communication.

Each PDCP PDU received at the RLC layer 215 as a RLC SDU, such for example RLC SDU denote as RLC $SDU_1$, RLC $SDU_2$ and RLC $SDU_3$ in FIG. 5A, is processed by a RLC TX entity 310 for generating one or more corresponding RLC PDUs, such as the RLC $PDU_{tx}$ shown in FIG. 5A.

For example, RLC $SDU_2$ is segmented in two parts (only one of which shown in FIG. 5A), one of which, preferably a first part RLC $SDU_{2\text{-}p1}$, is combined with the RLC $SDU_1$ for forming a payload 505 of the corresponding RLC $PDU_{tx}$, which may be preferably ciphered with a RLC ciphering key.

Preferably, a (bit) size of the RLC $PDU_{tx}$ is determined based on the CQI assessed by the transmitter UE 105*tx* on the sidelink 120.

The RLC $PDU_{tx}$ further comprises a RLC header 510 which is combined with the payload 505. The RLC header 510 comprises a sequence number SN identifying the RLC $PDU_{tx}$.

The RLC $PDU_{tx}$ is passed to the MAC layer 220, where it is considered as a MAC SDU, i.e. MAC $SDU_{tx}$ shown in FIG. 5A.

At the MAC layer 220, the MAC $SDU_{tx}$ forms a payload 515 of a corresponding MAC PDU, i.e. MAC $PDU_{tx}$ of FIG. 5A.

The MAC $PDU_{tx}$ further comprises a MAC header 520 which is combined with the MAC payload 515. The MAC header 520 comprises a LCID value LCID identifying the logical RLC connection, i.e. the sequence of RLC PDUs to which the MAC payload 515 (i.e., the RLC $PDU_{tx}$) belongs.

According to an embodiment of the invention, as shown in the non-limiting example of FIG. 5A, one reserved bit TUN of the MAC header 520 is used for defining whether a data packet tunneling is requested or implemented. In case of DM connection, the tunneling is not requested and thus a value of the TUN bit is, e.g., set to zero (0; i.e., tunneling is not required).

Afterwards, the MAC PDU$_{tx}$ is passed to the physical layer 225 where is processed and transmitted to the receiver UE 105rx through the sidelink 120.

At the receiver UE 105rx, the MAC PDU$_{tx}$ is received at the physical layer 225 and delivered to the MAC layer 220. The value of the TUN bit is checked, and being set to zero, the MAC payload 515, i.e. the MAC SDU$_{tx}$ or RLC PDU$_{tx}$, is extracted and passed to a RLC RX entity 315 associated with the LCID value LCID contained in the MAC header 520, i.e. the RLC RX entity 315 arranged for managing received RLC PDUs of the sequence identified by the LCID value LCID (i.e., belonging to the same data flow).

At the RLC layer 215 as shown in FIG. 5B, the RLC PDU$_{tx}$ is buffered in the RLC RX entity 315 and then the RLC payload 505 (i.e., the RLC SDU$_1$ and the RLC SDU$_{2-p1}$) is extracted.

The segmented RLC SDUs, such as the RLC SDU$_2$ in the example of FIGS. 5A and 5B, are reconstructed once subsequent on or more RLC PDUs (not shown) of the sequence (comprising the remaining segments of the respective RLC SDUs) are receive, and then delivered to the PDCP layer 210.

It should be noted that the packet data are peered between transmitter UE 105tx and the receiver UE 105rx; therefore, RLC PDUs may be correctly reconstructed according to their sequence number SN.

Whenever a mode switching occurs from a DM connection to a IM connection (triggered whenever the CQI measured for an IM communication is assessed to be higher than the CQI of the established DM connection), the communication between the transmitter UE 105tx and the receiver UE 105rx proceeds in a substantially lossless manner as described in the following by making reference to FIGS. 6A to 6E, which schematically shows a communication based on an IM connection according to an embodiment of the invention.

After a mode switch, at the transmitter UE 105tx the operation proceeds substantially in the same manner as described above with respect to a DM connection.

Figure 6A:
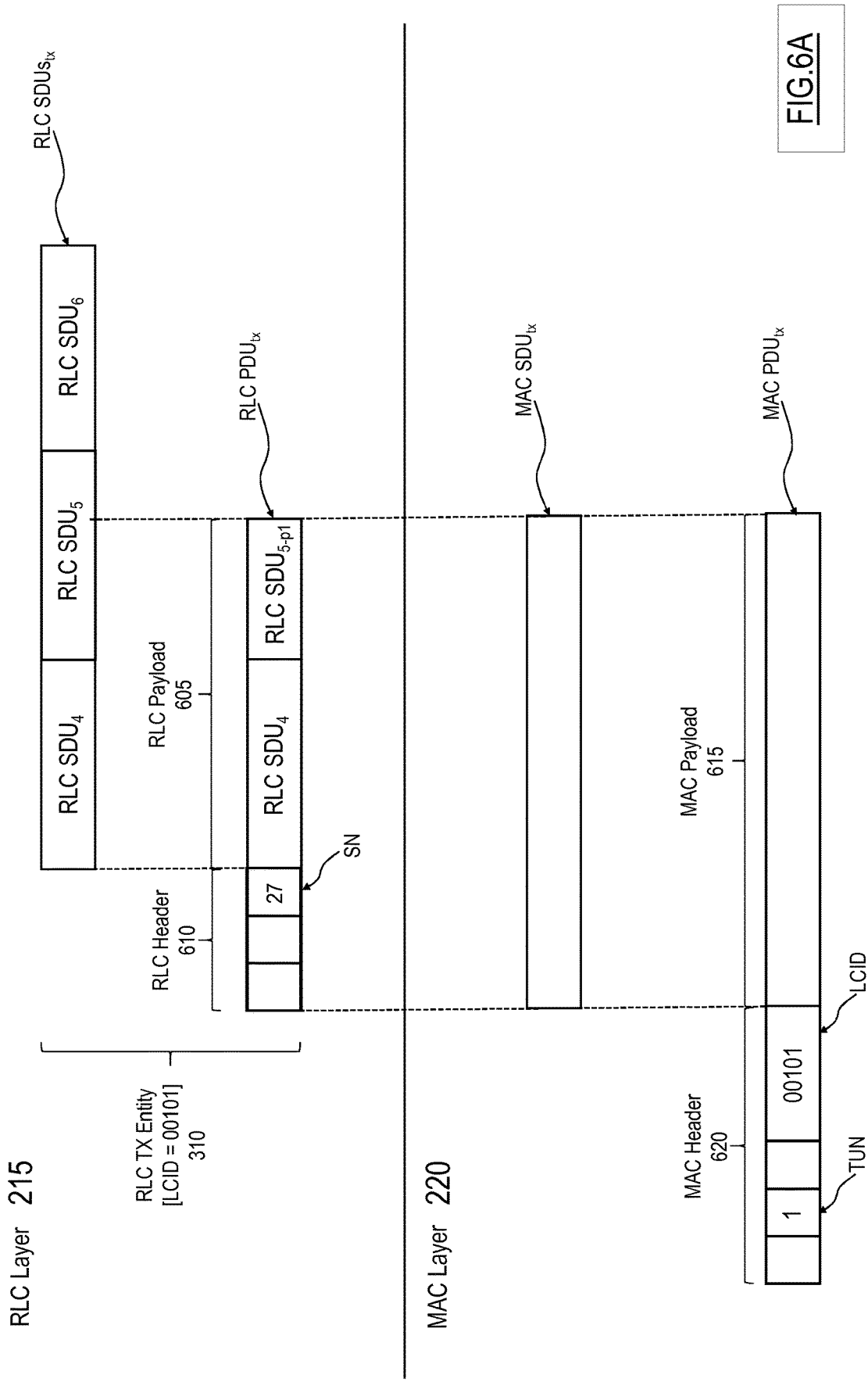

Each PDCP PDU received at the RLC layer 215 of the transmitter UE 105tx as a RLC SDU, such for example RLC SDUs denoted as RLC SDU$_4$, RLC SDU$_5$ and RLC SDU$_6$ in FIG. 6A, is processed by a RLC TX entity 310 for generating one or more corresponding RLC PDUs, such as the RLC PDU$_{tx}$ shown in FIG. 6A.

For example, RLC SDU$_5$ is segmented in two parts (only one of which shown in FIG. 6A), one of which, preferably a first part RLC SDU$_{5-p1}$, is combined with the RLC SDU$_4$ for forming a payload 605 of the corresponding RLC PDU$_{tx}$, which may be preferably ciphered with a RLC ciphering key.

Preferably, a (bit) size of the RLC PDU$_{tx}$ is determined based on the CQI assessed by the eNB 110 on the UL leg 115ul of the IM connection.

The RLC PDU$_{tx}$ further comprises a RLC header 610 which is combined with the payload 605. The RLC header 610 comprises a sequence number SN identifying the RLC PDU$_{tx}$.

The RLC PDU$_{tx}$ is passed to the MAC layer 220, where it is considered as a MAC SDU, i.e. MAC SDU$_{tx}$ shown in FIG. 6A.

At the MAC layer 220, the MAC SDU$_{tx}$ forms a payload 615 of a corresponding MAC PDU, i.e. MAC PDU$_{tx}$ of FIG. 6A.

The MAC PDU$_{tx}$ further comprises a MAC header 620 which is combined with the MAC payload 615. The MAC header 620 comprises a LCID value LCID identifying the logical RLC connection, i.e. the sequence of RLC PDUs to which the MAC payload 615 (i.e., the RLC PDU$_{tx}$) belongs.

In the non-limiting example of FIG. 6A, the TUN bit of the MAC header 520 is set to one (1; i.e., tunneling is required) since the communication is switched to an IM connection.

Afterwards, the MAC PDU$_{tx}$ is passed to the physical layer 225 where is processed and transmitted to the eNB 110 through the UL leg 115ul of the IM connection.

At the eNB 110 (as shown in FIG. 6B), the MAC PDU$_{tx}$ is received at the physical layer 225 and delivered to the MAC layer 220. The value of the TUN bit is checked, and being set to one, the MAC payload 615, i.e. the MAC SDU$_{tx}$ or RLC PDU$_{tx}$, is extracted and passed to a RLC relay entity 305 of the RLC layer 215.

It should be noted that in case a MAC PDU (transmitted by a UE, not shown) received at the eNB 110 has a TUN value TUN set to zero, such MAC PDU is processed according the known procedure used in IM connections.

The RLC relay entity 305 is associated with the LCID value LCID contained in the MAC header 620, i.e. the RLC relay entity 305 is arranged for managing received RLC PDUs of the sequence identified by the LCID value LCID (i.e., belonging to the same data flow).

It should be noted that the packet data transmitted by the transmitter UE 105tx through the UL leg 115ul of the IM connection does not require to be peered with the eNB 110 in the embodiments according to the present invention, since they have not to be re-ordered and/or reconstructed (as described in the following).

At the RLC layer 215, the RLC PDU$_{tx}$ is buffered in the RLC relay entity 305.

According to an embodiment of the invention, the RLC PDU$_{tx}$ buffered in the RLC relay entity 305 is considered as a RLC SDU, e.g. a RLC SDU$_{eNB}$ in the example of FIG. 6B (instead of being transferred to the PDCP layer 210 as in the known solutions).

Thus, the RLC SDU$_{eNB}$ (i.e., the RLC PDU$_{tx}$) is processed as a RLC SDU effectively received from the PDCP layer 210 of the protocol stack layer of the eNB 110.

Figure 6C:
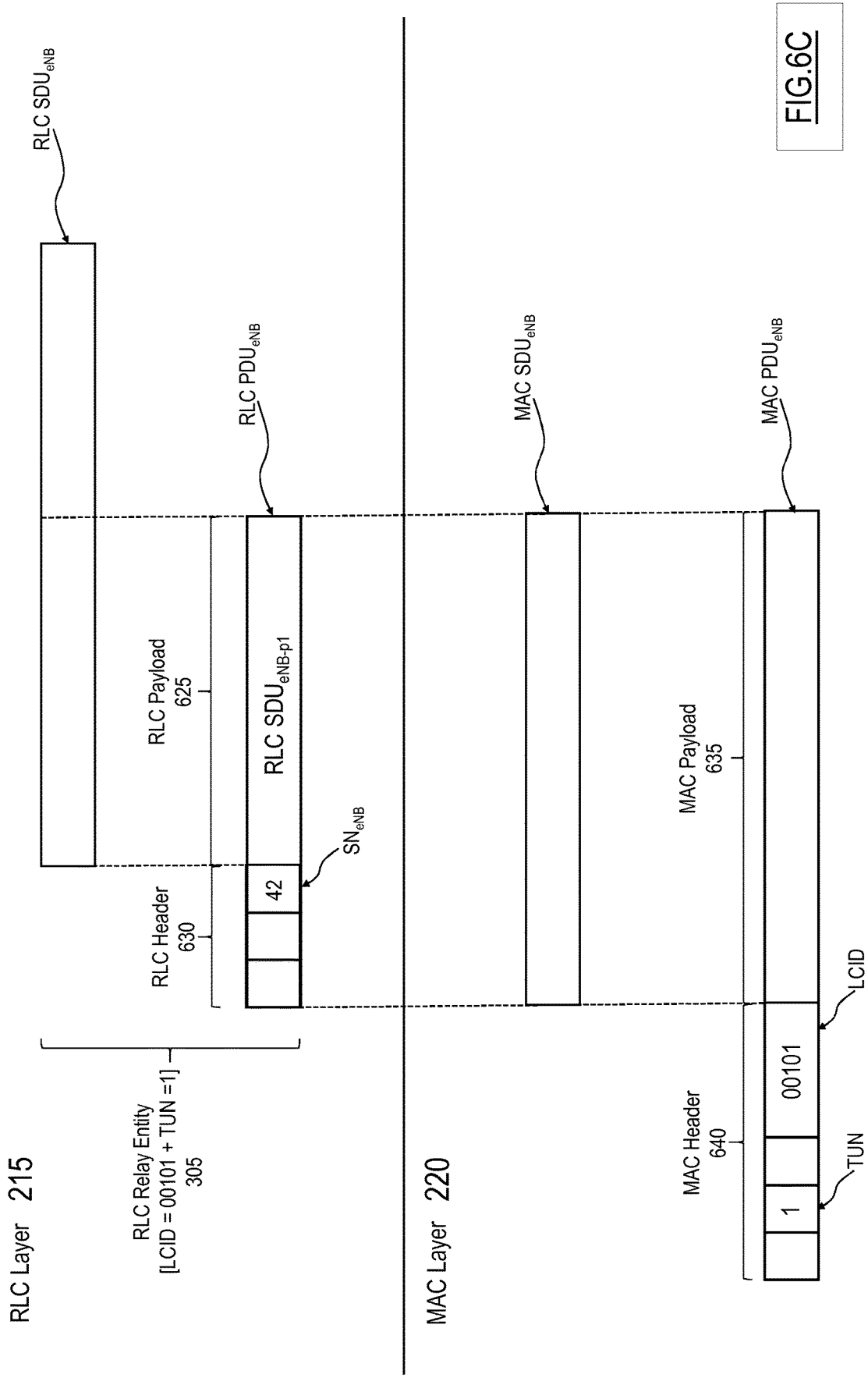

In other words, RLC SDU$_{eNB}$ may be segmented in two or more parts (as shown in FIG. 6C), one of which, preferably a first part RLC SDU$_{eNB-p1}$ forms a payload 625 of the corresponding RLC PDU$_{eNB}$, which may be preferably ciphered with a RLC ciphering key.

Preferably, a (bit) size of the RLC PDU$_{eNB}$ is determined based on the CQI assessed by the eNB 110 on the DL leg 115dl of the IM connection.

The RLC PDU$_{eNB}$ further comprises a RLC header 630 which is combined with the payload 625. The RLC header 630 comprises a sequence number SN$_{eNB}$ that identify and allows ordering the RLC PDU$_{eNB}$ within a sequence of RLC PDUs to which belongs.

The RLC PDU$_{eNB}$ is passed to the MAC layer 220, where it is considered as a MAC SDU, i.e. MAC SDU$_{eNB}$ shown in FIG. 6C.

At the MAC layer 220, the MAC SDU$_{eNB}$ forms a payload 635 of a corresponding MAC PDU, i.e. MAC PDU$_{eNB}$ of FIG. 6C.

The MAC PDU$_{eNB}$ further comprises a MAC header 640 which is combined with the MAC payload 635. The MAC header 640 comprises the LCID value LCID identifying the logical RLC connection, i.e. the sequence of RLC PDUs to which the MAC payload 635 (i.e., the RLC PDU$_{eNB}$) belongs.

In the non-limiting example of FIG. 6C, the TUN bit of the MAC header 520 is set to one (1; i.e., tunneling is implemented).

Afterwards, the MAC PDU$_{eNB}$ is passed to the physical layer 225 where is processed and transmitted to the receiver UE 105rx through the DL leg 115dl of the IM connection.

At the receiver UE 105rx, the MAC PDU$_{eNB}$ is received at the physical layer 225 and delivered to the MAC layer 220. The value of the TUN bit is checked, and being set to one, the MAC payload 635, i.e. the MAC SDU$_{eNB}$ or RLC PDU$_{eNB}$, is extracted and passed to a tunnel RLC RX entity 320 associated with the LCID value LCID contained in the MAC header 640 (as shown in FIG. 6D), i.e. the tunnel RLC RX entity 320 arranged for managing received RLC PDUs of the sequence identified by the same LCID value LCID.

Figure 6E:
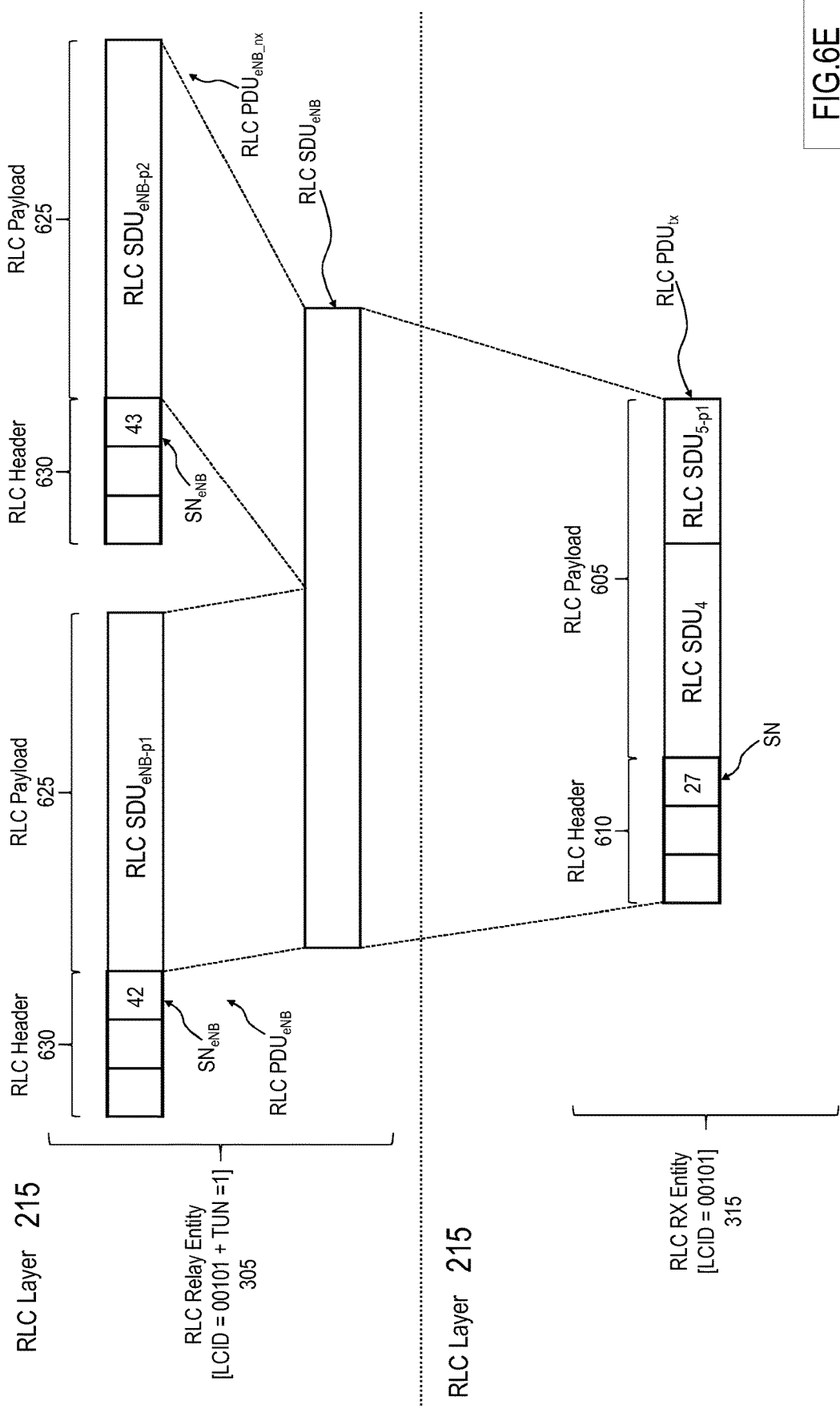

At the tunnel RLC RX entity 320 in the RLC layer 215, the MAC SDU$_{eNB}$ (i.e., MAC PDU$_{eNB}$), which comprises the first part RLC SDU$_{eNB\text{-}p1}$ of the RLC SDU$_{eNB}$, is buffered until one or more next MAC SDU$_{eNB\_nx}$ (i.e., RLC PDU$_{eNB\_nx}$, only one shown in the example shown in FIG. 6E) comprising the remaining parts of the RLC SDU$_{eNB}$, are received at the tunnel RLC RX entity 320.

It should be noted that the packet data transmitted through the DL leg 115dl of the IM connection by the eNB 110 are peered with the receiver UE 105rx; therefore, RLC PDUs generated by the eNB 110, such as the RLC PDU$_{eNB}$, may be correctly reconstructed according to their sequence number SN$_{eNB}$ at the tunnel RLC RX entity 320 of the receiver UE 105rx.

Afterwards, the payloads 625 (i.e., the RLC SDU$_{eNB\text{-}p1}$ and the RLC SDU$_{eNB\text{-}p2}$) of the MAC SDU$_{eNB}$ and of the MAC SDU$_{eNB\_nx}$ are combined (at the tunnel RLC RX entity 320) in order to reconstruct the RLC SDU$_{eNB}$, i.e. the RLC PDU$_{tx}$ originally transmitted by the transmitter UE 105tx.

Particularly, the packet data generated by the eNB 110 are peered with the tunnel RLC RX entity 320 at the receiver UE 105rx; therefore, RLC PDUs may be correctly ordered according to their sequence number SN$_{eNB}$ and the RLC SDU$_{eNB}$ may be correctly reconstructed.

After being reconstructed, the payload 605 of the RLC PDU$_{tx}$ is buffered in a RLC RX entity 315 arranged for managing received RLC PDUs of the sequence identified by the same LCID value LCID.

At the RLC layer 215, the RLC PDU$_{tx}$ is buffered in the RLC RX entity 315 and then the RLC payload 605 (i.e., the RLC SDU$_4$ and the RLC SDU$_{5\text{-}p1}$) is extracted, the segmented RLC SDUs, such as the RLC SDU$_5$ in the example of FIG. 6E, are reconstructed once subsequent RLC PDUs (not shown) of the sequence are receive, and delivered to the PDCP layer 210.

It should be noted that the packet data generated by the transmitter UE 105tx are still peered with the RLC RX entity 315 at the receiver UE 105rx; therefore, RLC PDUs, such as the RLC PDU$_{tx}$, may be correctly ordered according to their sequence number SN and similarly the PDCP PDU (i.e., the RLC SDU) may be correctly reconstructed and then deciphered at the PDCP Layer 210.

Advantageously, a mode switch from IM connection to DM connection simply implies that the TUN bit is simply reset to zero in the MAC header of MAC PDUs generated at the transmitter UE 105tx after the mode switch; thus the communication proceeds seamlessly in DM connection as described above with respect to FIGS. 5A and 5B.

Thanks to the tunneling implemented during mode switching according to the present invention, avoidance of losses and avoidance of duplicates during a mode switch are substantially ensured.

Indeed, all RLC PDUs are sent only once by the transmitter UE 105tx, on either the sidelink 120 or UL leg 115ul. All RLC PDUs sent by the transmitter UE 105tx are then received by the same RLC RX entity 315 at the receiver UE 105rx, i.e. the RLC RX entity 315 associated with the LCID value that identifies the data flow of the communication. Such RLC RX entity 315 performs reassembly and in-order delivery to the PDCP layer 210.

The mode switch is thus fully transparent to any PDCP entities at the PDCP layer 210.

Moreover, a reduction of the overhead at the eNB 110 is attained (i.e., in IM connection), since data packets have not to traverse the whole protocol stack at the eNB 110 but are forwarded to the receiver UE 105rx after reaching the RLC layer 215.

Thus data packets transmitted by the transmitter UE 105tx do not require any reassembly of segments of the RLC SDUs (such as RLC SDU$_{5\text{-}p1}$ in the example of FIGS. 6A-6E) at the RLC layer 215 of the eNB 110 since they passed at higher protocol layers.

Particularly, PDCP PDU transmitted by the transmitter UE 105tx are not processed at the PDCP layer 210 of the eNB 110. This entails that, de-cyphering of PDCP PDUs received from the RLC layer 215, transmission to higher layers (I.e., IP layer 205 and upper protocol layers) for further processing, receipt of data packets resulting from such further processing, cyphering of said received data packets and generation of corresponding PDCP PDUs to be sent to the receiver UE 105rx are completely avoided.

Thus, a general reduction of the workload of the eNB 110, while assisting switching D2D communications, is attained.

The mode switching according to an embodiment of the present invention allows for a reduction of latency. In facts, since according to the present invention the eNB 110 does not perform reassembly on data packets at RLC layer 210 and does not forward the IP data packets extracted from the PDCP SDU to the core network (i.e. that manages the operation at higher protocol stack layers above the IP layer 205) before generating corresponding data packets to be sent to the receiver UE 105rx, the relaying of data packets received from the transmitter UE 105tx to the receiver UE 105rx is faster.

In alternative embodiment of the invention, instead of implementing a further RLC PDU at the RLC layer 210 of the eNB 110, part of the retransmission mechanism of the Acknowledged Mode, or AM, at the RLC layer 210 is exploited. The retransmission mechanism of the AM is thoroughly described in 3GPP-TS 36.322 v12.2.0, "Evolved Universal Terrestrial Radio Access (E-UTRA); Radio Link Control (RLC) protocol specification", March 2015 and is not herein reported for the sake of brevity.

According to an embodiment of the present invention, the eNB 110 is arranged to manage the transmission buffer included in the RLC Relay entity 305 as a retransmission buffer.

When a MAC PDU (e.g., such as the MAC PDU$_{tx}$ of the exemplary embodiment described with reference to FIGS. 6A-6E) having a TUN value TUN set to one is received at the eNB 110 from the transmitter UE 105tx the corresponding RLC PDU (contained in the payload of the MAC PDU) is queued into a RLC Relay entity 305 (as in the exemplary embodiment described with reference to FIGS. 6A-6E).

In this case, the RLC PDU is not considered as a new RLC SDU to be tunneled into another RLC PDU, as described above. Instead, the RLC PDU, such as the RLC $PDU_{tx}$, is tunneled by being re-segmented according to the retransmission mechanism used in an AM RLC entity (not shown).

In case of using the RLC AM, the RLC PDUs sent by the transmitter UE 105*tx* received at the eNB 110 may be tunneled into one or more RLC AM PDUs, such as the AM PDU of FIG. 7, to be sent to the receiver UE 105*rx*.

It should be noted that RLC PDUs sent by the transmitter UE 105*tx* received at the eNB 110 may also be segmented in two or more RLC AM PDUs, so as to adapt to possibly different MAC PDU size due to different CQIs of the UL leg 115*ul* and the DL leg 115*dl* of the IM connection.

In such case, at least a segment of the payload (i.e., the RLC SDU) of the original RLC PDU (such as the payload 605, the RLC $SDU_{tx}$, of the RLC $PDU_{tx}$ of the exemplary embodiment described with reference to FIGS. 6A-6E) may be mapped into a payload 705 of the AM PDU.

Moreover, a header 710 of the AM PDU may be set as described hereinbelow in order to allow the receiver UE 105*rx* correctly extracting the segment of the payload of the RLC PDU tunneled into the AM PDU.

For example, a flag RF of the header 710 of the AM PDU may be set to one (1), so as to indicate that the AM PDU comprises a segment of the payload of the RLC PDU.

A sequence number value SNAM of the header 710 of the AM PDU is set as the same sequence number value SN contained in the header of the original RLC PDU generated by the transmitter UE 105*tx*.

A field SO of the header 710 of the AM PDU may be exploited for indicating a position (e.g., in bytes) of the segment of the payload of the AM PDU in the RLC SDU of which is part.

A field LSF of the header 710 of the AM PDU indicates whether the last byte of the segment of the payload of the RLC PDU corresponds to the last byte of the RLC PDU.

For example, if the eNB 110 receives a RLC PDU comprising 100 bytes from the transmitter UE 105*tx*, the RLC PDU at the RLC Relay entity 305 may be segmented into two segments each with a size of 50 bytes.

Each segment maintains the SN value SN of the original RLC PDU, whereas the field SO is set accordingly (e.g., the AM PDU comprising the first segment of the RLC PDU has a filed SO set to a lower value than the value of the field SO of the AM PDU comprising the second segment of the RLC PDU).

At the receiver UE 105*rx*, the RLC AM PDU can be sent to the RLC RX entity 315 that peers directly with the transmitter UE 105*tx* (i.e., a LCID value LCID identifying the logical RLC connection used for DM transmission). This means that receiver UE 105*rx* has to perform reassembly only once, since the SN value SN remain the same used in the UL leg 115*ul* of the IM connection and, thanks to the use of field SO, there is enough information for performing a reassembly of the two segments of the RLC PDU.

It should be noted that AM RLC does not allow concatenating segments of two different PDUs, since only one SN value SN may be specified in the header 710 of the AM PDU. Such limitation that may lead to an overall reduction in the system throughput with respect to the previous embodiment.

The Applicant has further performed simulations that highlight the benefits of the described solutions.

The Applicant has found that the mode switching according to the embodiments of the present invention allows for an improvement of cell throughput.

Indeed, reduction in latency implies a throughput improvement particularly (although not limitatively) for data flows using TCP.

As known, TCP data flows (due to the nature of the TCP protocol itself) are susceptible to losses and duplicates, which may cause degradation of the TCP congestion window and consequently reduce the sending rate.

The tunneling implemented in the mode switch according to the embodiments of the present invention avoids both losses and duplicates during a mode switching.

In detail, a radio network arrangement comprising a pair of D2D-capable UE, performing a file transfer using TCP has been considered (such as the radio network arrangement shown in FIGS. 1A and 1B).

During the TCP file transfer the UE cyclically moved (e.g., ad a speed substantially equal to 3 m/s) towards each other and in opposite directions, so as to allow periodic mode switching (e.g., triggered whenever the CQI measured of the current IM or DM connection became lower than the CQI of the other connection mode).

Figure 8:
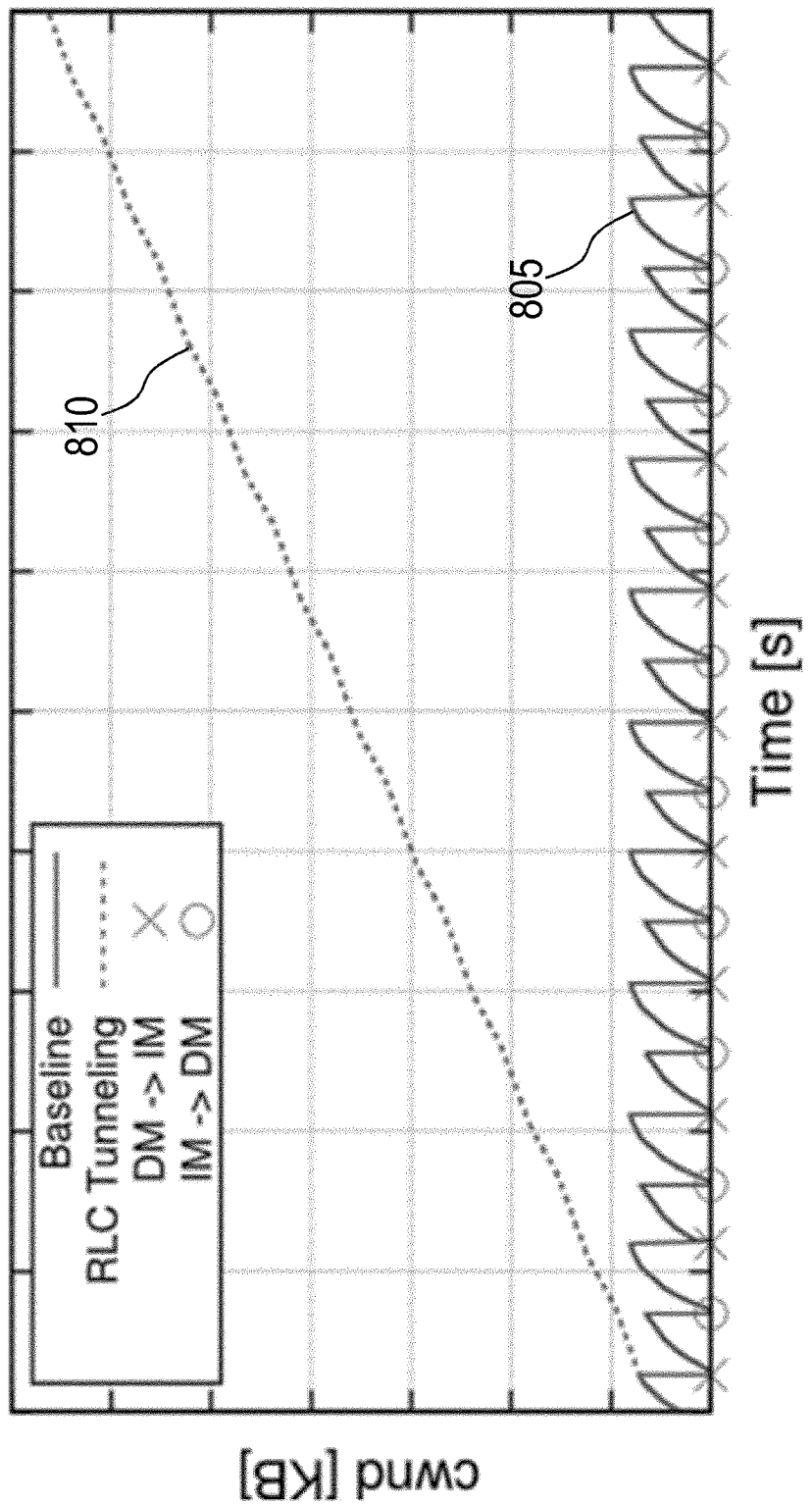
FIG. 8 is a plot of a TCP congestion window as a function of time for a radio network arrangement implementing a mode switching according to an embodiment of the present invention and of a known solution.

FIG. 8 shows the evolution of the TCP congestion window (measured in KB) over time (measured in seconds).

In FIG. 8, crosses and circles indicate time instants at which a mode switch is triggered; particularly, crosses indicate DM connection to IM connection mode switches, while circles indicate IM connection to DM connection mode switches.

The solid line 805 refers to a radio network arrangement of the known art, i.e. in which the solution according to the present invention is not implemented (used as a baseline for comparison). In this case, at mode switch all buffered data packets are dropped and no attempt to recover them (in the LTE stack) is made, which is a behavior of known 3GPP-compliant UE during a mode switch.

Such data packets drop lead to a reduction (substantially a reset) of the TCP congestion window at every mode switch, as can be clearly appreciated from FIG. 8.

Conversely, the dashed line 810 refers to a radio network arrangement according to the embodiments of the present invention.

As can be appreciated from FIG. 8, the radio network arrangement according to the embodiments substantially completely avoids window reductions and provides a substantially linear growth of the TCP congestion window over time (i.e., the dashed line 810 shows a substantially linear increase over time).

Figure 9:
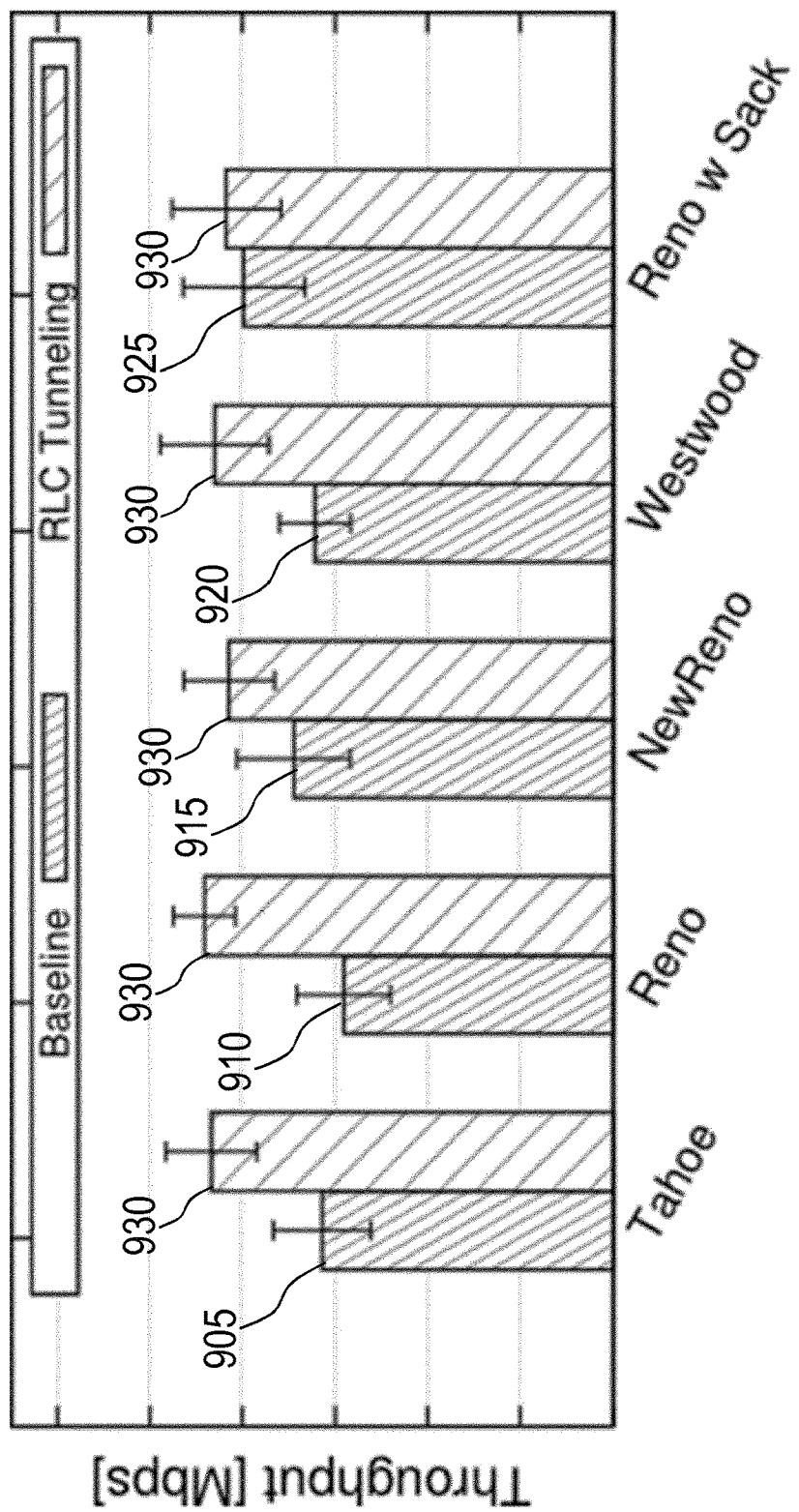
FIG. 9 is a schematic bar chart comparing a throughput achieved by a radio network arrangement implementing the mode switching according to an embodiment of the present invention with a throughput achieved by a radio network arrangement implementing TCP congestion control algorithm known in the art.

FIG. 9 is a bar chart showing application layer throughputs associated with the considered TCP file transfer.

Particularly, different radio network arrangements, each implementing a respective TCP congestion control algorithm known in the art, have been tested and compared (in terms of application layer throughput) with a radio network arrangement according to the present invention.

In detail, bin 905 refers to a radio network arrangement implementing Tahoe algorithm, bin 910 refers to a network arrangement implementing Reno algorithm, bin 915 refers to a radio network arrangement implementing New Reno algorithm, bin 920 refers to a radio network arrangement implementing Westwood algorithm, and bin 925 refers to a radio network arrangement implementing Reno with Selective Acknowledgements algorithm, while bins 930 refers to a radio network arrangement according to the present invention.

The Applicant observed that the application layer throughput is always substantially higher in the radio network arrangement according to the present invention with respect to radio network arrangements implementing known TCP congestion control algorithms, only the "Reno with Selective Acknowledgements" algorithm shows performance comparable with the solution according to embodiments of the present invention.

The invention claimed is:

1. A method for managing data packets transmitted by a first user equipment to be received by a second user equipment through a radio network, the method comprising:
receiving, by a radio transceiver station of the radio network, data packets transmitted by the first user equipment, the data packets being Medium Access Control data packets;
for each data packet, checking, by the radio transceiver station, whether the data packet comprises a sequence of plural bits to indicate a request for a data packet tunneling;
for each data packet comprising a request for data packet tunneling, providing, by the radio transceiver station, the data packet to a relay protocol entity at a Radio Link Control protocol layer;
generating, by the relay protocol entity, at least one tunneling data packet by inserting at least a portion of the transmitted data packet into the at least one tunneling data packet; and
transmitting, by the relay protocol entity, the tunneling data packet to the second user equipment,
wherein the payload of the data packet comprises at least a portion of a Radio Link Control data packet, and generating at least one tunneling data packet comprises:
generating at least one Radio Link Control tunneling data packet at the Radio Link Control protocol layer, said generating at least one Radio Link Control tunneling data packet comprises inserting at least a portion of the Radio Link Control data packet into the at least one Radio Link Control tunneling data packet,
wherein the Radio Link Control tunneling data packet comprises a tunneling header portion and a tunneling payload portion, and wherein generating at least one Radio Link Control tunneling data packet comprises:
inserting the at least a portion of the Radio Link Control data packet in the payload of the at least one Radio Link Control tunneling data packet,
wherein the Radio Link Control data packet comprises a header portion and a payload portion,
wherein the header portion of the Radio Link Control data packet comprises an indication of a position in a sequence of Radio Link Control data packets thereof, and the tunneling header portion of the Radio Link Control tunneling data packet comprises an indication of a tunneling position in a sequence of Radio Link Control tunneling data packets thereof, and
wherein the indication of a position is different from the indication of a tunneling position.

2. The method according to claim 1, wherein the checking whether the data packet comprises the sequence of plural bits in the header of the data packet to indicate a request for a data packet tunneling comprises:
checking whether the sequence of plural bits conforms to a predetermined pattern.

3. The method according to claim 1, wherein transmitting the tunneling data packet to the second user equipment comprises:
generating a Medium Access Control data packet, the Medium Access Control data packet comprising a header portion and a payload portion, the header of the Medium Access Control data packet comprises an indication that a tunneling of data packets has been implemented, and the payload of the Medium Access Control data packet comprises the at least one Radio Link Control tunneling data packet, and
transmitting the Medium Access Control data packet to the second user equipment.

4. The method according to claim 1, wherein generating at least one tunneling data packet, comprises:
generating at least one tunneling data packet as at least one Acknowledge Mode data packet, and
inserting at least a portion of the transmitted data packet into the at least one Acknowledge Mode data packet.

5. The method according to claim 4, wherein the transmitted data packet comprises a Radio Link Control data packet, the Radio Link Control data packet comprising an indication of a position in a sequence of Radio Link Control data packets thereof, and
wherein generating at least one tunneling data packet as at least one Acknowledge Mode data packet comprises
setting an indication of a position in a sequence of Acknowledge Mode data packets of the Acknowledge Mode data packet equal to the indication of a position in a sequence of Radio Link Control data packets comprised in the Radio Link Control data packet.

6. The method according to claim 5, wherein inserting at least a portion of the transmitted data packet into the at least one Acknowledge Mode data packet comprises:
segmenting the Radio Link Control data packet in two or more segments,
for each segment of the Radio Link Control data packet:
inserting the segment of the Radio Link Control data packet in a respective Acknowledge Mode data packet, and
providing in the Acknowledge Mode data packet an indication of a position of the segment of the Radio Link Control data packet in the Radio Link Control data packet of which is part.

7. A radio network comprising a radio transceiver station arranged for managing data packets transmitted by a first user equipment to be received by a second user equipment, the radio transceiver station comprising hardware, firmware, a combination of hardware and software, or software configured for implementing the method according to claim 1.

8. A method for managing data packets transmitted by a first user equipment to be received by a second user equipment, the method comprising:
receiving, by a second user equipment, data packets transmitted by the first user equipment or by a radio transceiver station of a radio network, the data packets being Medium Access Control data packets;
for each data packet, checking, by the second user equipment, whether the data packet comprises a sequence of plural bits in a header of the data packet to indicate the implementation of a data packet tunneling;
for each data packet comprising an indication of the data packet tunneling, providing the data packet to a tunneling receiver protocol entity at a Radio Link Control protocol layer;
extracting, by the tunneling receiver entity, at least a portion of a tunneled data packet from said data packet; and
providing, by the tunneling receiver entity, the at least a portion of a tunneled data packet to a receiver protocol entity at the Radio Link Control protocol layer,
wherein the payload portion of the data packets comprises a Radio Link Control tunneling data packet, and extracting at least a portion of a tunneled data packet from said data packet comprises:

extracting at least a portion of a Radio Link Control data packet generated by the first user equipment from the Radio Link Control tunneling data packet, wherein said Radio Link Control tunneling data packet comprises a header portion and a payload portion, the at least a portion of a Radio Link Control data packet generated by the first user equipment being comprised in said payload portion of the Radio Link Control tunneling data packet, and wherein the header portion of the Radio Link Control tunneling data packet comprises an indication of a position in a sequence of Radio Link Control tunneling data packets thereof, and providing the at least a portion of a tunneled data packet to a receiver protocol entity at the Radio Link Control protocol layer comprises:

reconstructing a Radio Link Control data packet by combining portions of the Radio Link Control data packet contained in the payload of Radio Link Control tunneling data packet comprising indications of adjacent positions in a sequence of Radio Link Control tunneling data packets.

9. The method according to claim 8, the checking whether the header of the data packet comprises a request for a data packet tunneling comprises:

checking whether the sequence of plural bits conforms to a predetermined pattern.

10. A user equipment arranged for transmitting to and receiving from a further user equipment data packets by means of a Direct Mode connection in which data packets are directly transmitted to and received from the further user equipment or by means of an Infrastructure Mode connection in which data packets are transmitted to and received from the user equipment and the further user equipment through a radio transceiver station of a radio network, the user equipment comprising hardware, firmware, a combination of hardware and software, or software configured for implementing the method according to claim 8.

* * * * *